(12) United States Patent
Cvek

(10) Patent No.: US 8,714,645 B2
(45) Date of Patent: May 6, 2014

(54) PIVOTING MECHANISM WITH GROSS AND FINE RESISTANCE ADJUSTMENT

(76) Inventor: Sava Cvek, Jamaica Plain, MA (US)

( * ) Notice: Subject to any disclaimer, the term of this patent is extended or adjusted under 35 U.S.C. 154(b) by 522 days.

(21) Appl. No.: 13/016,958

(22) Filed: Jan. 28, 2011

(65) Prior Publication Data

US 2012/0025578 A1 Feb. 2, 2012

Related U.S. Application Data

(60) Provisional application No. 61/298,961, filed on Jan. 28, 2010.

(51) Int. Cl.
*A47C 1/024* (2006.01)
(52) U.S. Cl.
USPC ............... 297/301.4; 297/303.5; 297/302.4
(58) Field of Classification Search
USPC ............ 297/289, 299, 301.4, 303.4, 303.5
See application file for complete search history.

(56) References Cited

U.S. PATENT DOCUMENTS

| | | | | |
|---|---|---|---|---|
| 1,336,510 A * | 4/1920 | Collier | ...................... | 297/301.4 |
| 1,836,630 A * | 12/1931 | Thum | ...................... | 297/302.4 |
| 2,410,871 A * | 11/1946 | Fields et al. | ............... | 297/301.4 |
| 2,615,496 A | 10/1952 | Lorenz | | |
| 2,819,911 A | 1/1958 | Syak | | |
| 3,369,840 A | 2/1968 | Dufton | | |
| 3,740,792 A | 6/1973 | Werner | | |
| 4,345,733 A * | 8/1982 | Ambasz et al. | ............... | 248/561 |
| 4,709,962 A | 12/1987 | Steinmann | | |
| 4,761,033 A | 8/1988 | Lanuzzi | | |
| 4,854,641 A | 8/1989 | Reineman | | |
| 5,026,117 A * | 6/1991 | Faiks et al. | ................. | 297/300.5 |
| 5,042,876 A * | 8/1991 | Faiks | ......................... | 297/301.4 |
| 5,080,318 A | 1/1992 | Takamatsu | | |
| 5,160,184 A * | 11/1992 | Faiks et al. | ................. | 297/300.5 |
| 5,328,237 A * | 7/1994 | Yamaguchi et al. | ....... | 297/303.4 |
| 5,356,199 A | 10/1994 | Elzenbeck | | |
| 5,375,912 A * | 12/1994 | Stulik et al. | ................ | 297/302.4 |
| 5,725,276 A * | 3/1998 | Ginat | ............................ | 297/289 |
| 5,772,282 A | 6/1998 | Stumpf | | |
| 5,979,984 A * | 11/1999 | DeKraker et al. | .......... | 297/300.5 |
| 6,039,397 A * | 3/2000 | Ginat | ............................ | 297/289 |
| 6,386,634 B1 | 5/2002 | Stumpf | | |
| 6,709,056 B2 * | 3/2004 | Bock | .......................... | 297/300.4 |
| 6,709,058 B1 | 3/2004 | Diffrient | | |
| 6,959,965 B2 | 11/2005 | Diffrient | | |
| 6,966,604 B2 | 11/2005 | Stumpf | | |
| 7,490,902 B2 * | 2/2009 | Aubert | ....................... | 297/300.5 |
| 7,806,478 B1 | 10/2010 | Cvek | | |
| 7,850,237 B2 * | 12/2010 | Gorgi | ......................... | 297/303.1 |
| 8,146,990 B2 * | 4/2012 | Bock | .......................... | 297/300.4 |
| 2005/0275265 A1 | 12/2005 | Deimen | | |

* cited by examiner

*Primary Examiner* — David E Allred
(74) *Attorney, Agent, or Firm* — O'Connell Law Firm; Thomas P. O'Connell

(57) ABSTRACT

A pivoting mechanism with gross and fine adjustment with a housing, an elongate shaft pivotally retained by the housing, resiliently deformable members retained by the housing, cam members coupled to the shaft wherein the cam members are disposed to deform the resiliently deformable members when the cam members are pivoted, and a locking slide bar for selectively causing the cam members to pivot with the shaft to produce gross adjustments in pivoting resistance. First and second ends of the shaft can act as an output interface for outputting the pivoting resistance exhibited by the shaft to a seat back structure, a seat bottom structure, or some other structure. A threaded rod rotated by a handle can adjust an initial deformation of the first resiliently deformable member for fine pivoting resistance adjustment.

35 Claims, 21 Drawing Sheets

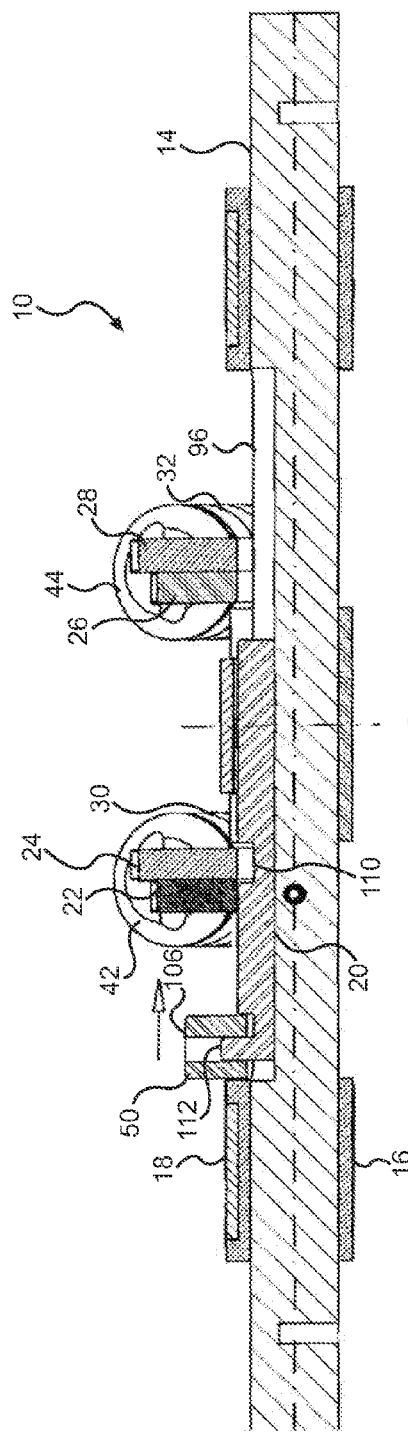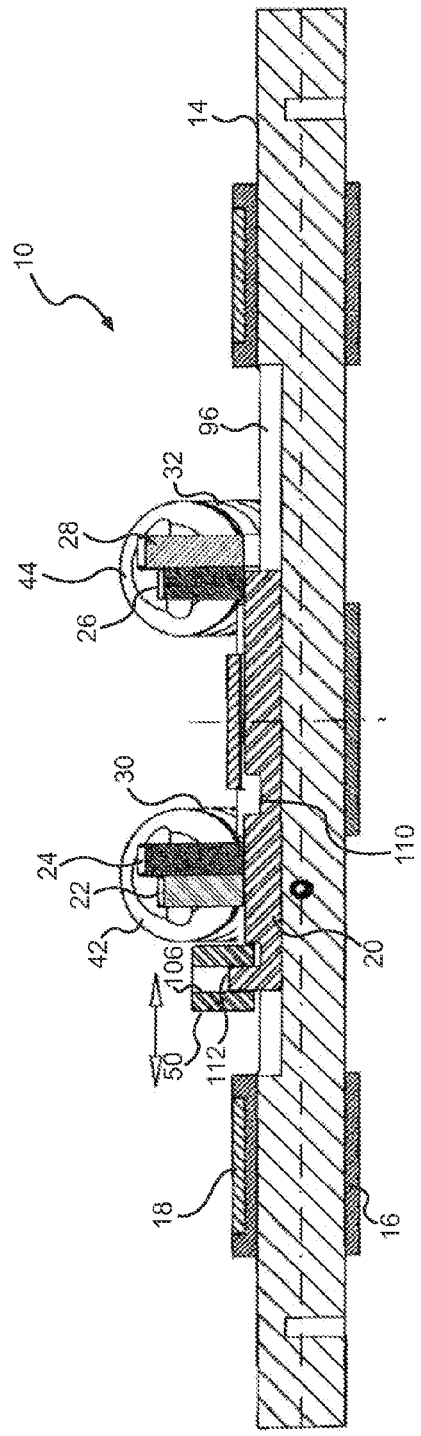

PIVOTING MECHANISM WITH GROSS AND FINE RESISTANCE ADJUSTMENT

FIELD OF THE INVENTION

The present invention relates generally to pivoting mechanisms. More particularly, disclosed herein are pivoting mechanisms capable of gross adjustment between multiple resistance zones and, potentially, fine adjustment within each resistance zone.

BACKGROUND OF THE INVENTION

Numerous chair designs have been proposed with a back structure retained to pivot in relation to a seat structure by a pivoting mechanism. Under certain constructions, the resistance provided by the pivoting mechanism cannot be adjusted. With this, large users, small users, and users with different preferences are provided with identical pivoting resistance. Consequently, lighter users may find that a chair provides far too much resistance while heavier users are likely to find that the same chair provides insufficient support against pivoting.

In other constructions, the resistance provided by the pivoting mechanism can be adjusted over a given range of resistance. With this, a user can seek to adjust the resistance provided by the pivoting mechanism to suit his or her physical characteristics and personal preferences. However, the range over which the pivoting mechanism is adjustable is commonly limited so that not all users will be accommodated even where the full range of adjustment is exploited. Furthermore, the adjustable pivoting mechanisms of the prior art typically require a continuous adjustment through the range of pivoting resistance. For example, many arrangements require that the user adjust the pivoting resistance by continuous rotation of a knob awkwardly disposed below the seat to adjust an initial deflection of a compression spring. This adjustment is time consuming and laborious.

The light user sitting in a chair previously adjusted to suit a heavy user must adjust the chair from the increased resistance set for the heavy user to the lesser resistance appropriate to the light user by numerous rotations of the adjustment knob. The same is true of a single user desiring to adjust from the increased resistance he desired for a meeting to the decreased resistance sought for reclining during a conference call. In these and other circumstances requiring large adjustments in pivoting resistance, the user of a seat with a prior art pivoting mechanism must either undertake the tedious adjustment process or forego the desired support characteristics.

With a knowledge of the foregoing, the present inventor has appreciated that a pivoting mechanism capable of enabling rapid, gross resistance adjustment between multiple resistance zones and, potentially, fine resistance adjustment within each given resistance zone would represent a marked advance in the art.

SUMMARY OF THE INVENTION

With an appreciation for the state of the art summarized above, the present inventor set forth with the basic object of providing a pivoting mechanism for seating and other structures capable of rapid adjustment between multiple resistance zones.

A further object of embodiments of the invention is to provide a pivoting mechanism that permits fine resistance adjustment within each given resistance zone.

An additional object of particular embodiments of the invention is to provide a pivoting mechanism that additionally permits control and actuation of additional performance characteristics in a seating arrangement.

Yet another object of embodiments of the invention is to provide an adjustable pivoting mechanism that is compact in construction thereby to permit maximum space for internal and external components.

These and in all likelihood further objects and advantages of the present invention will become obvious not only to one who reviews the present specification and drawings but also to those who have an opportunity to experience an embodiment of the adjustable pivoting mechanism disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF DRAWINGS

In the accompanying drawing figures:

FIG. 14 is a cross-sectional view of the pivoting mechanism taking along the line 14-14 in FIG. 1 in a first resistance setting;

FIG. 15 is a cross-sectional view of the pivoting mechanism taking along the line 14-14 in FIG. 1 in a second resistance setting;

DETAILED DESCRIPTION OF PREFERRED EMBODIMENTS

The adjustable pivoting mechanisms disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

The pivoting mechanism disclosed herein is commonly depicted as being employed relative to a chair, and that application has been found to produce a chair construction that is particularly advantageous in structure and function. However, it is to be understood that the pivoting mechanisms could be employed in other applications within the scope of the invention except as it may be expressly limited. Therefore, before any particular embodiment of the invention is explained in detail, it must be made clear that the following details of construction and illustrations of inventive concepts are mere examples of the many possible manifestations of the invention.

Figure 1:
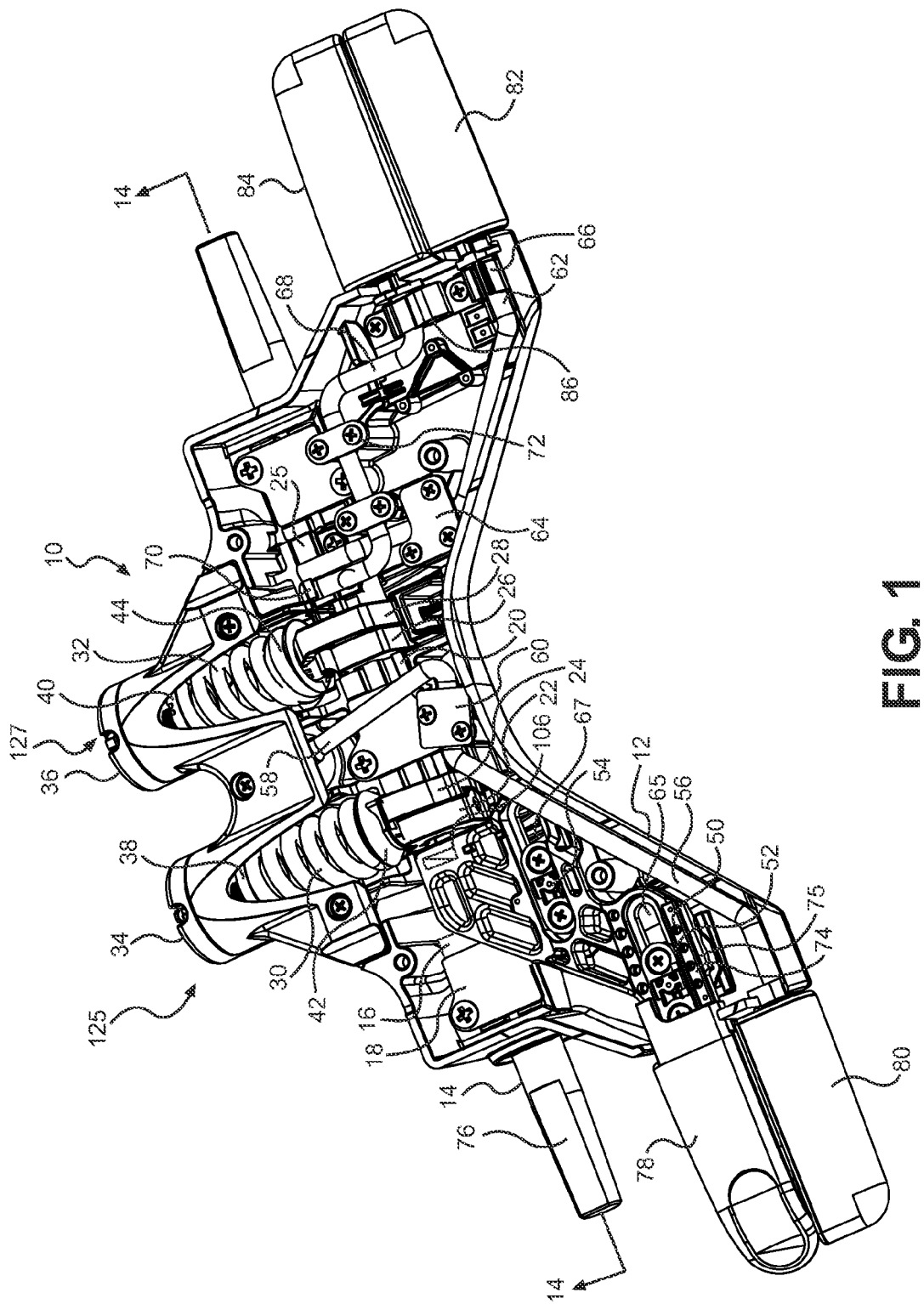
FIG. 1 is a perspective view of a pivoting mechanism with gross and fine resistance adjustment according to the present invention.

Turning more particularly to the drawings, an embodiment of pivoting mechanism with gross and fine adjustment mechanisms pursuant to the present invention is indicated generally at 10 in FIG. 1. The adjustable pivoting mechanism 10 is founded on a housing 12. The housing 12 has an upper rim and a contoured base portion for receiving and retaining various components of the pivoting mechanism 10 as described and shown herein. The housing 12 has an anterior, a posterior, and left and right sides.

Figure 2:
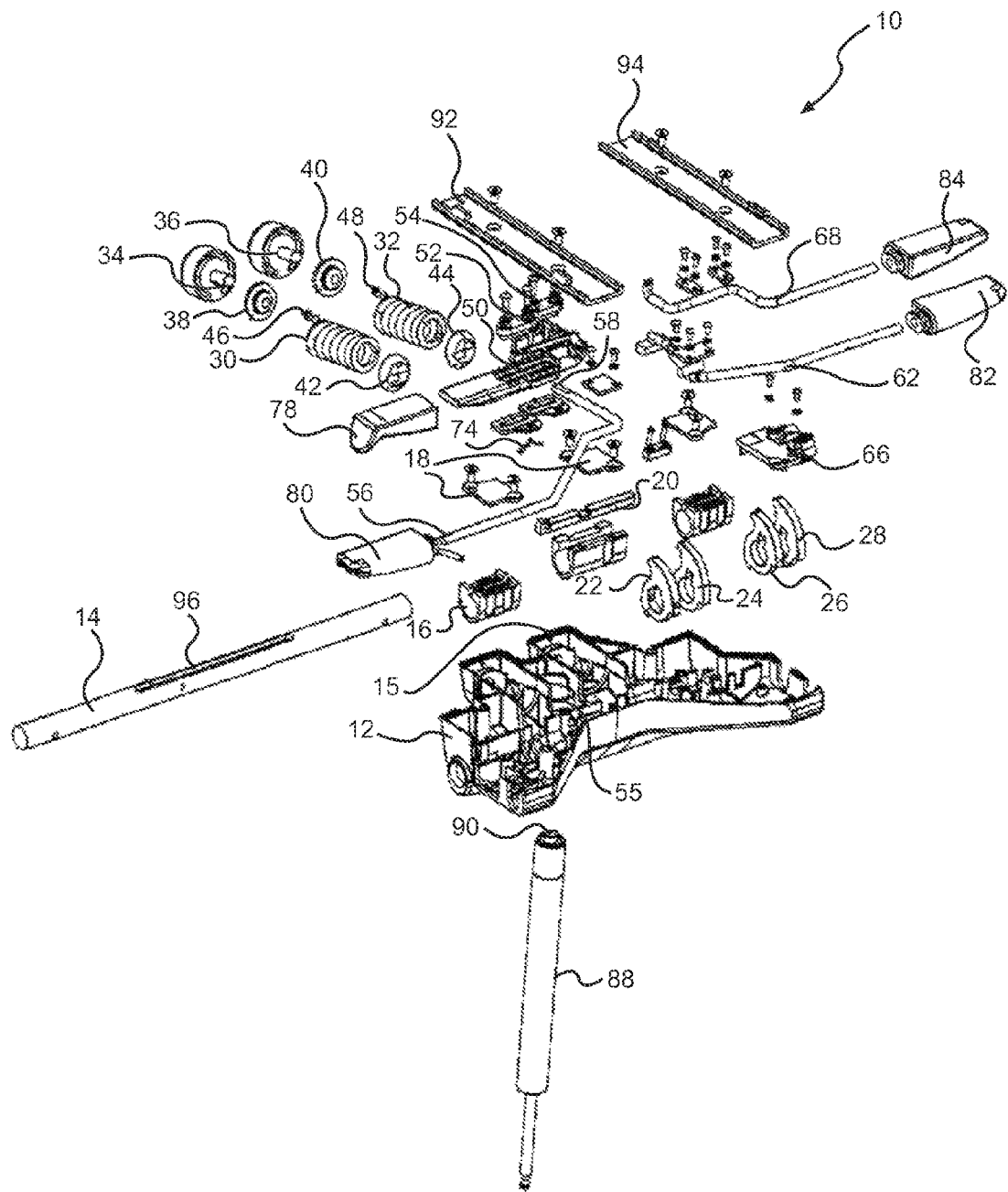
FIG. 2 is an exploded perspective view of the pivoting mechanism of FIG. 1.

An elongate shaft 14 has a round body portion that traverses laterally across the housing 12 and first and second end portions that project outboard of the first and second sides of the housing 12. The shaft 14 is supported by low friction shaft bushings 16 that are retained in place by molded or otherwise formed brackets 15, which are shown in FIG. 2, and the shaft 14 is secured in place by bushing plates 18 that overly the shaft 14 in combination with fasteners 17 that are threadedly engaged or otherwise secured relative to the housing 12. With this, the elongate shaft 14 is retained to turn within the housing 12, and the first and second outboard end portions of the shaft 14 form an output interface of the pivoting mechanism 10.

Figure 3:
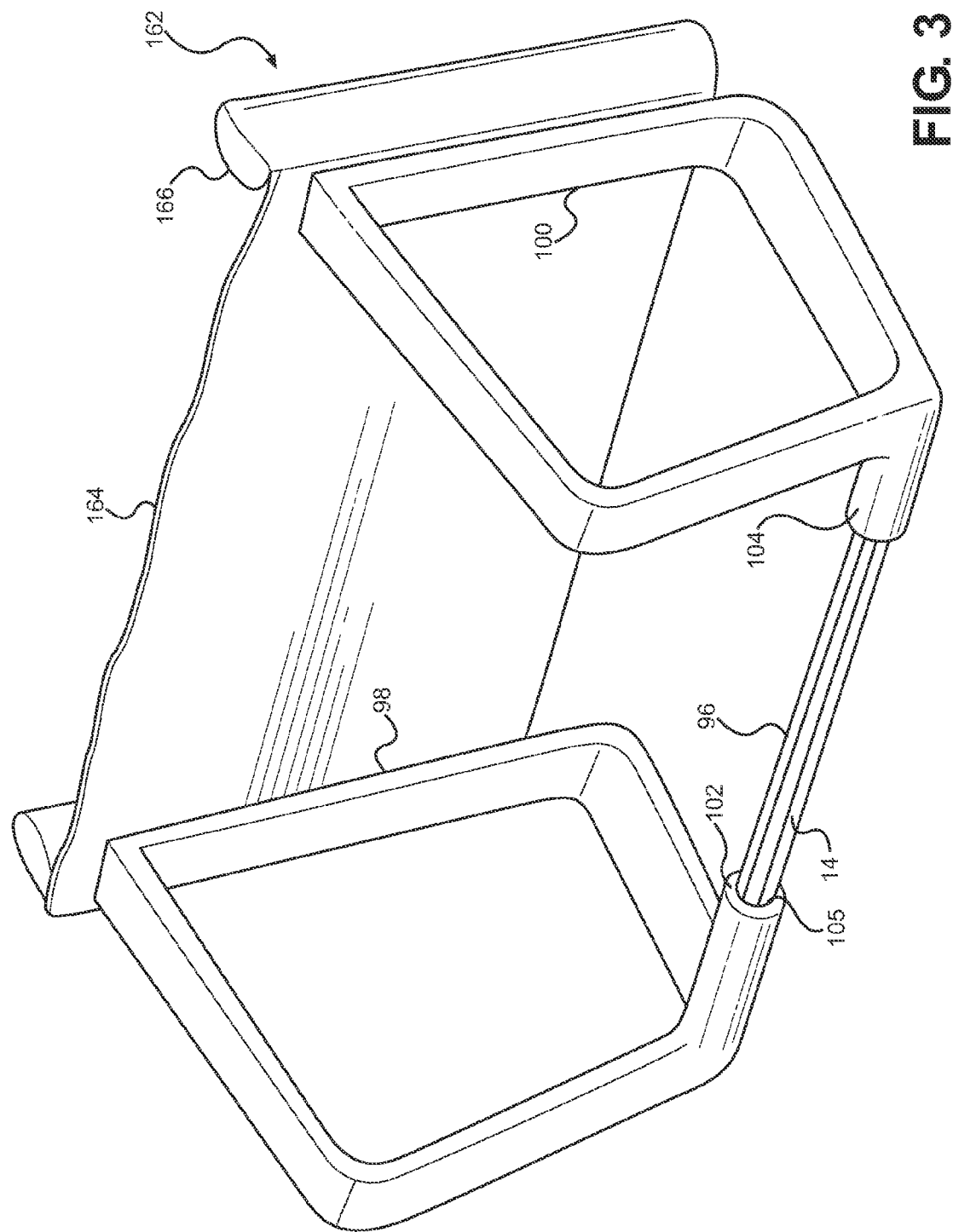
FIG. 3 a perspective view of a pivoting shaft retaining left and right armrests pursuant to the invention.
Figure 13:
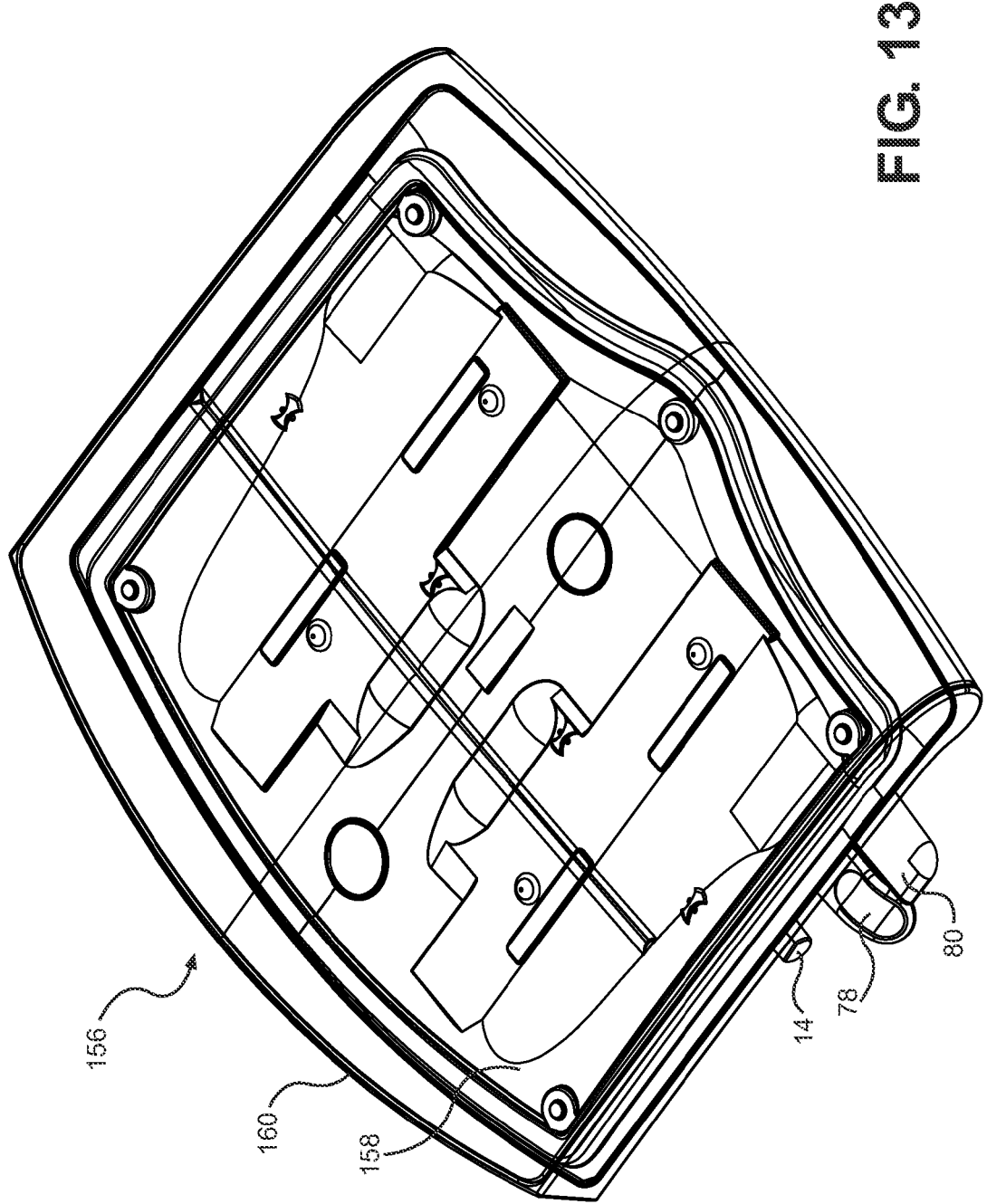
FIG. 13 is a perspective view of the pivoting mechanism of FIG. 1 with a seat secured in place.

The output interface can be better understood with additional reference to FIG. 3. There, it can be seen that the first and second end portions of the shaft 14 are retained to pivot with right and left arm structures 98 and 100 by being received into and fixed in relation to sleeves 102 and 104 of the left and right arm structures 98 and 100 respectively. In practice, the arm structures 98 and 100 retain a back structure 162, which could be of any type. The pivoting mechanism 10 supports and retains a seat structure 156 as shown in FIG. 13. The seat and back structures 156 and 162 could be of any type pursuant to the prior art or otherwise, except as they might be limited herein. In the depicted example, the back structure 162 comprises one or more layers of resilient material 164 retained by a framework 166.

The first and second end portions of the shaft 14 could be fixed in relation to the sleeves 98 and 100 in any appropriate manner, such as by welding, mechanical fasteners, adhesive, mechanical engagement, or any other effective arrangement or combination thereof. In the present embodiment, a mechanical engagement between the first and second end portions of the shaft 14 and the sleeves 98 and 100 is achieved by forming each of the first and second end portions of the shaft with a flat chamfer 76 that engages a matingly shaped inner wall 105 of the sleeves 98 and 100.

Looking additionally to FIG. 2, the housing 12 has an aperture 55 in the central portion thereof for receiving an upper portion of a hydraulic cylinder 88. The hydraulic cylinder 88 has an actuation tip 90 at the upper end thereof for permitting a selective extension and retraction of the hydraulic cylinder 88. A pivotable height adjustment lever 56 has a tip 58 at a first end thereof that is retained above the aperture 55. The height adjustment lever 56 has a second end that projects outboard of the right side of the housing 12. A handle 80 is fixed to the second end of the height adjustment lever 56. Under this arrangement, a user can actuate the height adjustment lever 56 by operation of the handle 80 to induce the tip 58 of the lever 56 to engage the actuation tip 90 of the hydraulic cylinder 88 to raise or lower the seat structure 156 and the remainder of the chair selectively.

Figure 12:
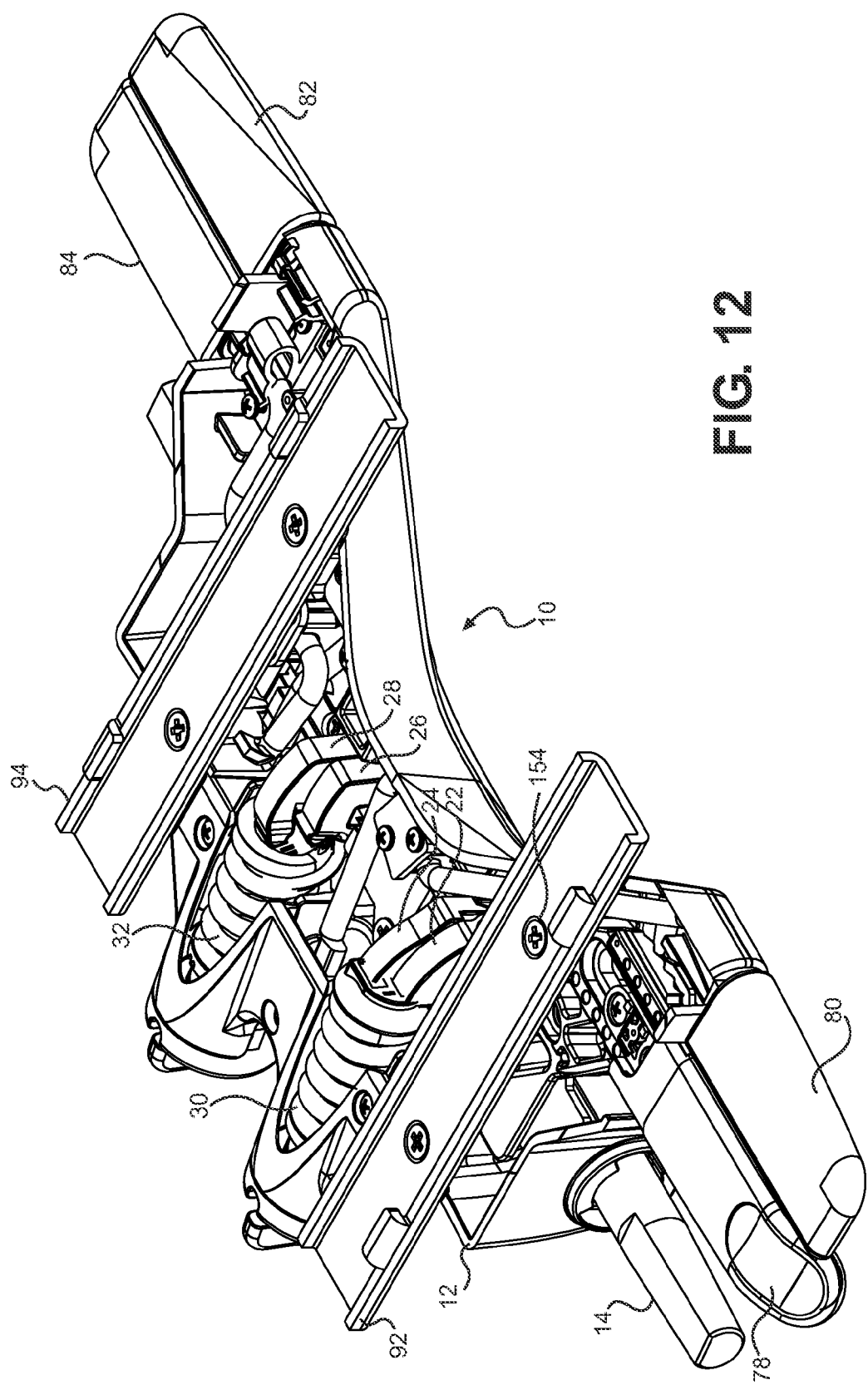
FIG. 12 is a perspective view of the pivoting mechanism of FIG. 1 with left and right slider brackets secured in place.

Left and right slider brackets 92 and 94 are secured to the housing 12 in a parallel relationship perpendicularly to the shaft 14 by fasteners 154 as is shown in FIG. 12. In this preferred embodiment, the left and right slider brackets 92 and 94 retain the seat structure 156 by a selectively slidable relationship between the brackets 92 and 94 and a base shell 158 of the seat structure 156. The base shell 158 retains a cushion arrangement 160. A seat slide lock lever 68 has a tip 70 at a first end thereof for engaging recesses that are fixed to move with the base shell 158 of the seat structure 156. The body portion of the seat slide lock lever 68 is pivotable by actuation of a handle 84 that is fixed to a second end of the seat slide lock lever 68. The handle 84 projects outboard of the left side of the housing 12. So arranged, the seat slide lock lever 68 can be pivoted by operation of the handle 84 to induce the tip 70 into and out of locking engagement with the seat structure 156. With this, the seat structure 156 can be selectively slid forwardly and rearwardly to a desired position and then locked in place.

Looking again to FIG. 1, a rebound spring clip 86, which could be formed from spring steel, resilient plastic, or any other material or combination thereof, is secured relative to the housing 12 and receives the seat slide lock lever 68. The rebound spring clip 86 has first and second resiliently engaged sides with first and second broadened portions therebetween. With this, the seat slide lock lever 68 can be positioned and retained by the clip 86 in a first position locking the seat structure 156 against movement and repositioned and retained by the clip 86 in a second position permitting sliding movement of the seat structure 156.

Under the depicted arrangement, the seat structure 156 is retained relative to the housing 12 via the left and right slider brackets 92 and 94, and the left and right arm structures 98 and 100 with the retained back structure 162 are retained relative to the housing 12 through the first and second end portions of the shaft 14 as seen in FIG. 3. With the arm structures 98 and 100 and the back structure 162 fixed to the shaft 14, the shaft 14 will turn within the housing 12 as the arm structures 98 and 100 and the back structure 162 pivot relative to the seat structure 156. The back structure 162 and the seat structure 156 are thus pivotally retained relative to one another to enable a seat occupant to sit in a fully upright manner, to recline to a given angle, or to be disposed anywhere therebetween.

Figure 19:
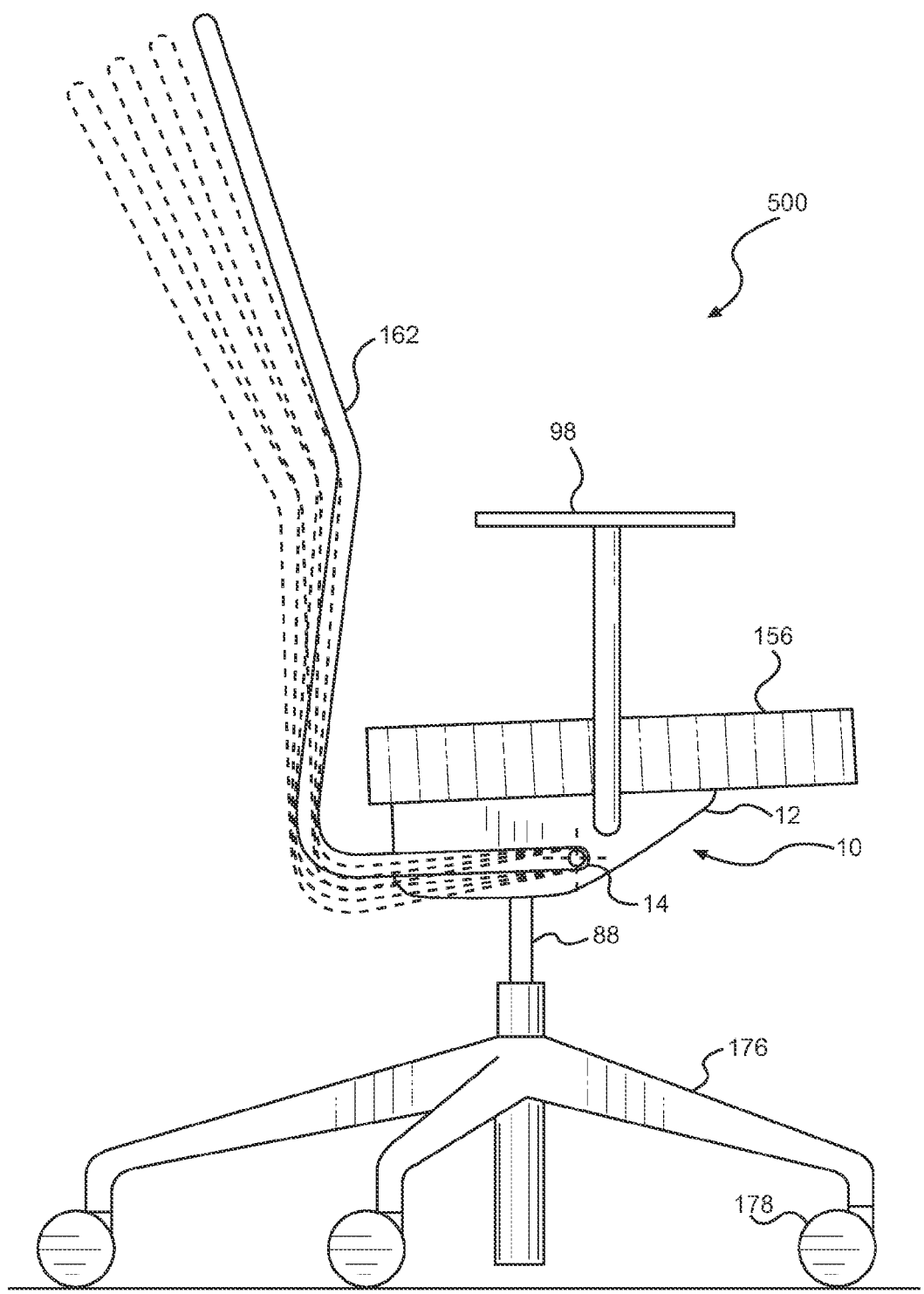
FIG. 19 is a view in side elevation of a chair incorporating a pivoting mechanism according to the present invention.

A complete chair 200 employing a pivoting mechanism 10 as taught herein is illustrated in FIG. 19. There, a seat structure 156 is secured atop the housing 12 of the pivoting mechanism 10, and arm structures 98 are secured to the outboard sides of the housing 12. A back structure 162 is pivotally retained by the pivoting mechanism 10 by the outboard ends of the shaft 14. The pivoting mechanism 10, and derivatively the seat and back structures 156 and 162, is supported by a piston 88 to permit a raising and lowering of the pivoting mechanism 10 and the seat and back structures 156 and 162. The lower end of the piston 88 is retained by a star chair base 176, and the chair 200 is rendered mobile by casters 178 retained at the distal ends of the legs of the star chair base 176. Under this arrangement, the seat and back structures 156 and 162 can be raised and lowered at the discretion of the occupant of the chair 200. The seat back structure 162 pivots independently of the seat bottom 156 whereby the seat back structure 162 can pivot rearwardly while the seat structure 156 remains stationary.

Adjustable resistance to the pivoting of the arm structures 98 and 100 and the back structure 162 relative to the seat structure 156 is provided by the pivoting mechanism 10, which is founded on the shaft 14. As seen, for example, in FIGS. 2 and 3, the shaft 14 has a channel 96 that communicates longitudinally along a central portion of the shaft 14. In this embodiment, the channel 96 is disposed facing upwardly, but it could be differently disposed.

A locking slide bar 20 is slidably received into the channel 96. In this embodiment, the locking slide bar 20 has a generally square or rectangular body portion 108, and the channel 96 has a squared base portion sized and shaped to receive the slide bar 20 in close mechanical engagement. Shown apart in FIG. 4, the locking slide 20 has a projecting tooth 112 at a first end thereof and a laterally disposed retaining channel 114 beside the tooth 112.

A resistance adjustment arm 50 is retained for longitudinal, sliding movement relative to the housing 12 by first and second slide blocks 52 and 54. The slide blocks 52 and 54 are fixed to the housing 12 and are received in corresponding slide channels 65 and 67 in the resistance adjustment arm 50. The blocks 52 and 54 provide bearing contact surfaces for the resistance adjustment arm 50 thereby providing a sliding movement aligned with the channel 96 and the retained slide bar 20.

The resistance adjustment arm 50 has a rectangular aperture 106 at a first end thereof that corresponds in size and shape to the size and shape of the tooth 112 of the locking slide bar 20, and the resistance adjustment arm 50 has a portion distal to the aperture 106 sized to be received into the retaining channel 114. Consequently, the tooth 112 can be received into the aperture 106 and the distal portion of the arm 50 can be received into the retaining channel 114 to cause the locking slide 20 to slide in response to a sliding of the resistance adjustment arm 50 within the channel 96. A handle 78 fixed to a second end of the resistance adjustment arm 50 projecting outboard of the right side of the housing 12 can thus be employed to slide the locking slide 20 within the channel 96.

As shown in FIG. 1, a bowed spring 74 can be retained relative to the housing 12 to ride over a plurality of ridges 75 on the resistance adjustment arm 50. The resistance adjustment arm 50 can thus be retained against inadvertent movement from a given position whereby the locking slide 20 can be retained in any one of a plurality of longitudinal positions in the channel 96. It will be appreciated that the spring 74 and the ridges 75 could be oppositely disposed and that numerous other means for selectively retaining the locking slide 20 in multiple longitudinal positions in the channel 96 would be possible and well within the scope of the invention.

Figure 5:
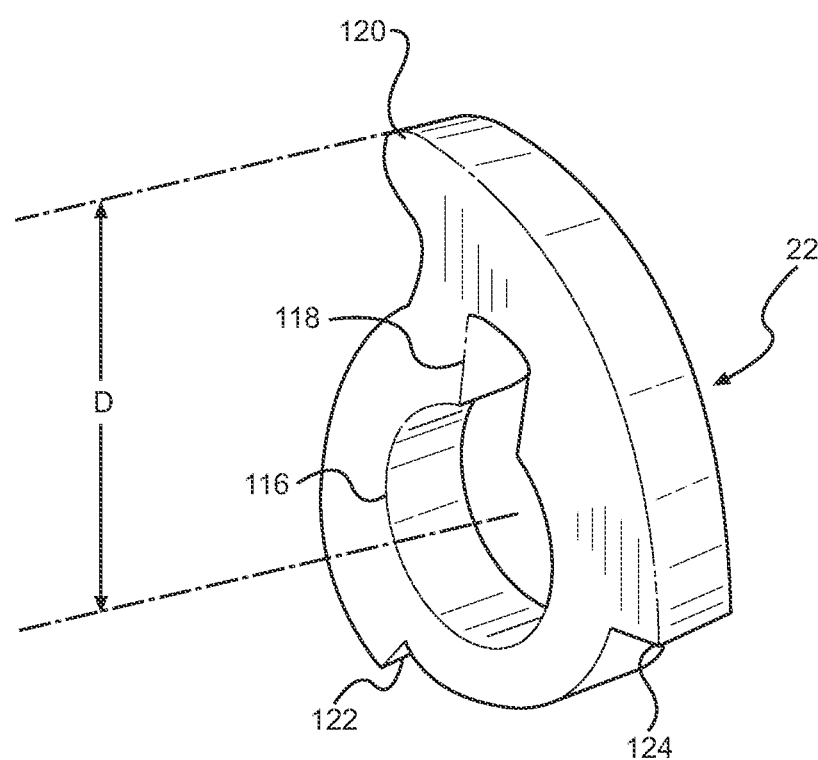
FIG. 5 is a perspective view a pivoting cam as taught herein.

As is shown in relation to a first cam 22 in FIG. 5, each of first, second, third, and fourth cams 22, 24, 26, and 28 has a round aperture 116 therein for receiving the shaft 14. The aperture 116 has a diameter marginally larger than the diameter of the shaft 14 whereby the cams 22, 24, 26, and 28 share a common center and axis of rotation with the shaft 14. Each cam 22, 24, 26, and 28 additionally has a lateral key channel 118 contiguous with the aperture 116 that corresponds in size and shape to that of the protruding portion of the locking slide 20. Accordingly, when the locking slide 20 is engaged with the key channel 118 of one or more cams 22, 24, 26, or 28, the cam or cams 22, 24, 26, and 28 is keyed or locked by the locking slide 20 to pivot with the shaft 14.

Figure 7:
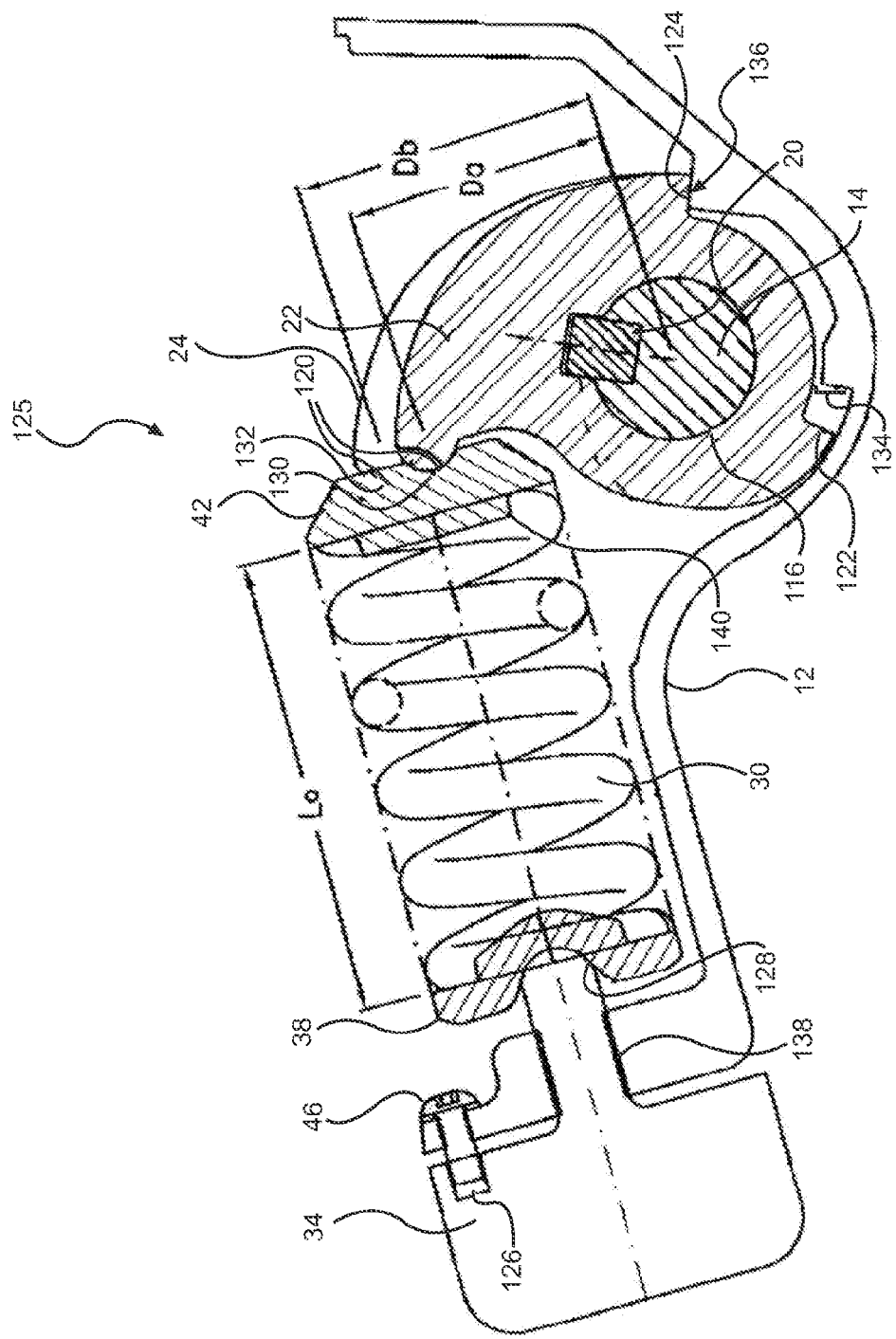
FIG. 7 is a partially sectioned view in side elevation of the pivoting mechanism of FIG. 1 in a first configuration.

As shown in FIG. 7, each cam 22, 24, 26, and 28 has a recline stop shoulder 122 and an oppositely facing upright stop shoulder 124. The stop shoulders 122 and 124 communicate generally radially from the center of the aperture 116 and are spaced by a given angular degree. The housing 12 has a recline stop shoulder 134 and an oppositely facing upright stop shoulder 136. The stop shoulders 134 and 136 communicate generally along a radius relative to the center of the aperture 116 and are spaced by an angular degree less than the separation between the stop shoulders 122 and 124 of the cams 22, 24, 26, and 28. The stop shoulders 122, 124, 134, and 136 thus permit the shaft 14 and the retained arm and back structures 98, 100, and 162 to pivot between an first, upright position where the upright stop shoulders 124 and 136 make contact to prevent further pivoting and a second, reclined position where the recline stop shoulders 122 and 134 make contact to prevent further pivoting.

Figure 4:
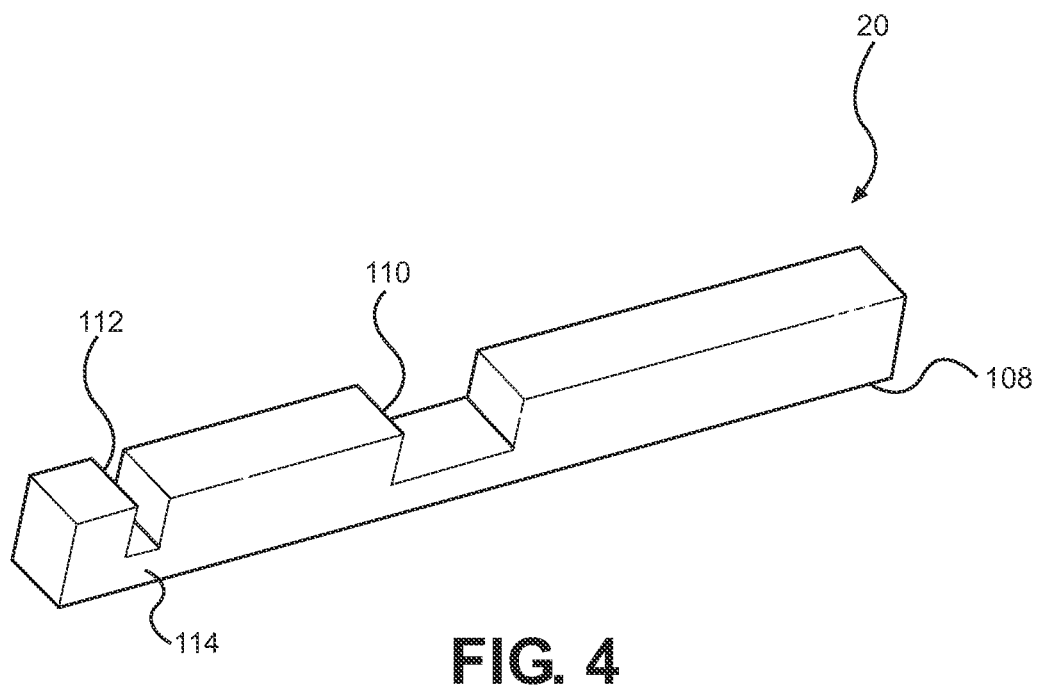
FIG. 4 is a perspective view of a locking slide pursuant to the invention disclosed herein.

As best seen in FIG. 4, a laterally disposed cam channel 110 is disposed in a mid-portion of the body portion 108 of the locking slide 20 between the retaining channel and the second end of the locking slide 20. The cam channel 110 is wider than the cams 22, 24, 26, and 28. Consequently, when the cam channel 110 is aligned with a given cam 22, 24, 26, or 28, that cam 22, 24, 26, or 28 will not be keyed to pivot with the shaft 14. Each cam 22, 24, 26, and 28 will also be freed from pivoting with the shaft 14 where the locking slide 20 is moved beyond the respective cam 22, 24, 26, or 28 by operation of the resistance adjustment arm 50. It would also be possible for multiple cam channels 110 to be provided or for the cam channel 110 to be wide enough to permit passage of more than one cam 22, 24, 26, and 28 simultaneously.

Each cam 22, 24, 26, and 28 has a lobe with an arcuate tip 120 spaced a given distance D from the center of the aperture 116. The distance D of the second cam 24 is greater than the distance D for the first cam 22, and the distance D of the fourth cam 28 is greater than the distance D of the third cam 26. The first and third cams 22 and 26 may have the same or different distances D, and the second and fourth cams 24 and 28 may have the same or different distances D.

Figure 6:
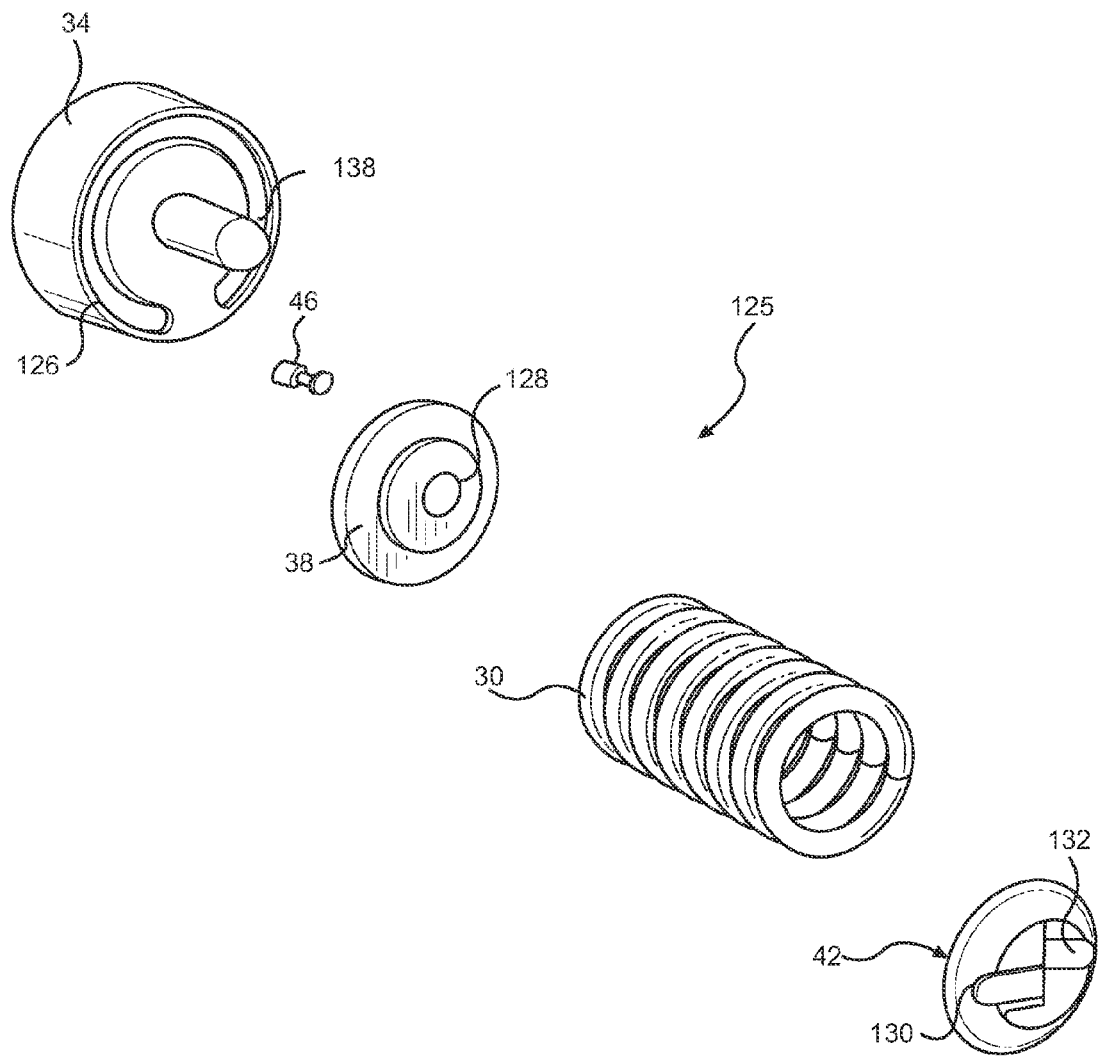
FIG. 6 is an exploded perspective view of a spring arrangement under the instant invention.

The tips 120 of the cams 22 and 24 contact a cam end spring cap 42 of a first spring arrangement 125, which is shown apart in FIG. 6. The tips 120 of the cams 26 and 28 contact a spring cap 44 of a second spring arrangement 127. Each of the caps 42 and 44 has an outer surface with an arcuate proximal receiving groove 130 and an arcuate distal receiving groove 132 that is staggered from the proximal receiving groove 130, preferably by the difference between the distances D of the cams 22 and 24 and 26 and 28. With reference to FIG. 7, each of the spring caps 42 and 44 has an annular retaining protuberance 140 that is received into and retains a first end of the respective springs 30 and 32.

Adjustment end spring caps 38 and 40 are disposed to a second end of the respective springs 30 and 32. Each spring cap 38 and 40 has a central conical protuberance 128 that is received into and retains a second end of the respective spring 30 and 32. The central conical protuberances 128 have a hemispherical underside surface into which the tip of an extension and retraction rod 138 is received. The rod 138 is extendable and retractable, which could be accomplished by a number of different means within the scope of the invention.

In the depicted embodiment, the extension and retraction rod 138 is threadedly engaged with the housing 12 and can be selectively rotated by an adjustment knob 34 relative to the first spring arrangement 125 and by an adjustment knob 36 relative to the second spring arrangement 127. Under this arrangement, the adjustment knobs 34 and 36 can be rotated to extend and retract the rod 138 and thereby to tend to compress or decompress the spring 30 or 32. With that, the initial deflection of the springs 30 and 32, and consequently the resistance provided, can be adjusted by a rotation of the knobs 34 and 36.

Where necessary or desirable, a means can be provided for limiting rotation of the knobs 34 and 36 to control the limits of the extension and refraction of the rod 138 and, as a result, the initial compression of the springs 30 and 32. In the present embodiment, the rotation of the knobs 34 and 36 is limited by a knob stop 46 fixed to the housing 12 that is received into an annular adjustment channel 126 that traverses less than the entire inner surface of the knobs 34 and 36 so that it has first and second ends. The knob stop 46 and the channel 126 thus prevent the springs 30 and 32 from being over tightened and prevent the rods 138 from being rotated out of engagement with the housing 12.

Figure 10:
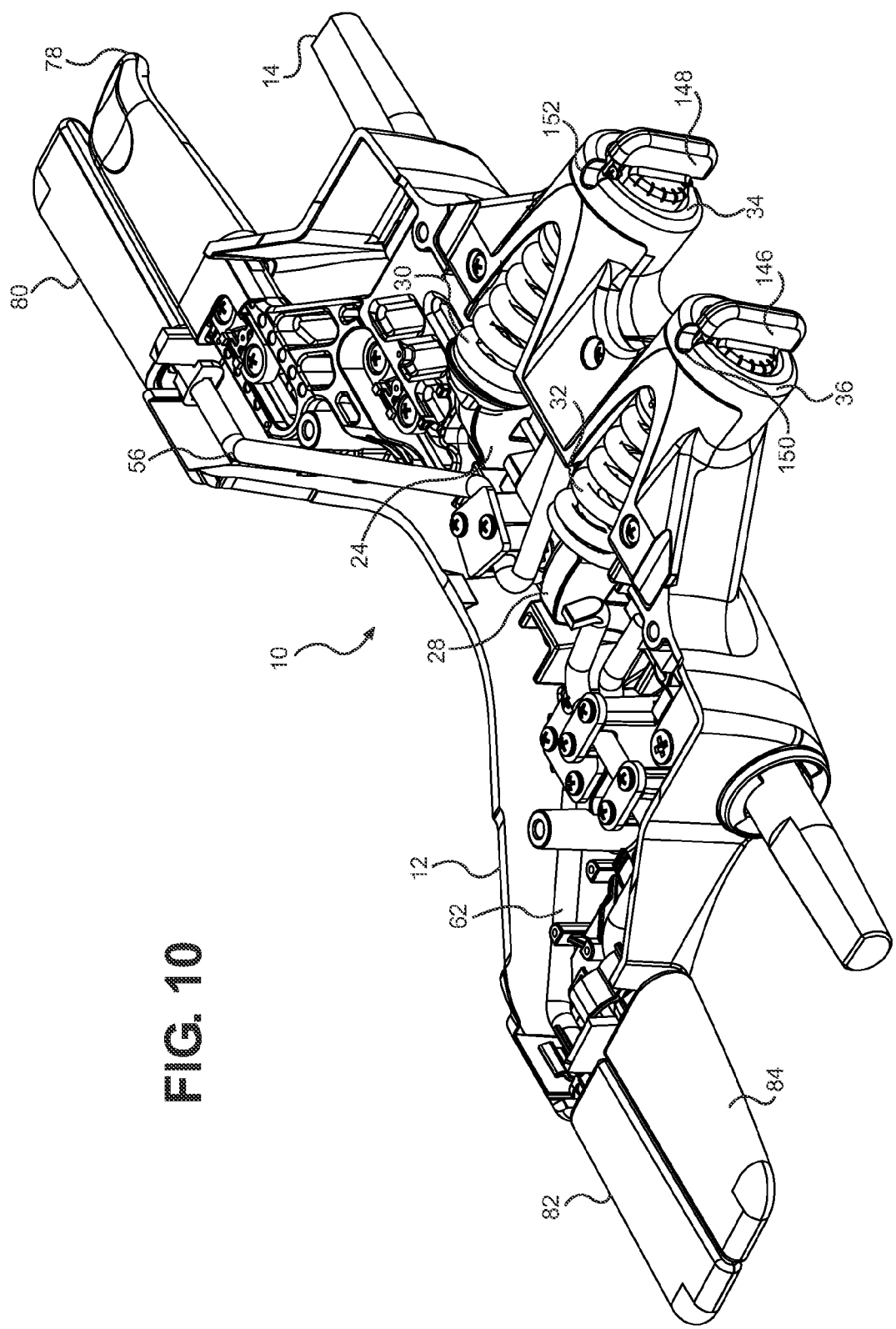
FIG. 10 is a rearward perspective view of the pivoting mechanism of FIG. 1 with the fine tension adjustment handles in an outwardly facing disposition.
Figure 11:
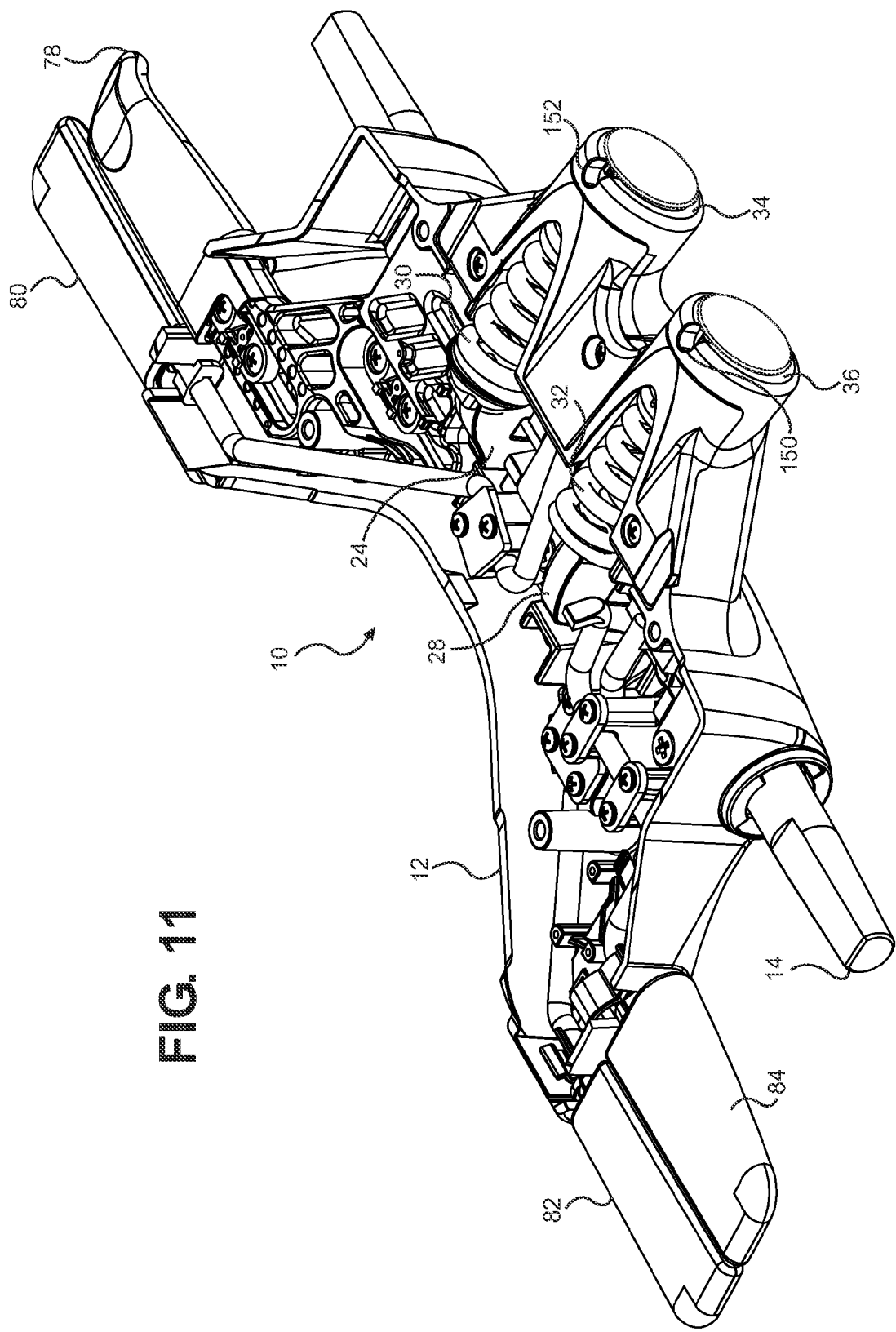
FIG. 11 is a rearward perspective view of the pivoting mechanism of FIG. 1 with the fine tension adjustment in an inwardly facing disposition.

As shown in FIGS. 10 and 11, it is possible that the knobs 34 and 36 could be reversible. The knobs 34 and 36 can have base portions and raised handles 146 and 148, and the housing 12 can have corresponding channels 150 and 152. With this, the knobs 34 and 36 can be disposed with the handles 146 and 148 facing outwardly as in FIG. 10 for permitting a rotation of the knobs 34 and 36, and the knobs 34 and 36 can alternatively be disposed with the handles 146 and 148 facing inwardly as in FIG. 11 once a desired adjustment setting is achieved to present a finished appearance and to prevent inadvertent repositioning of the handles 146 and 148.

Figure 8:
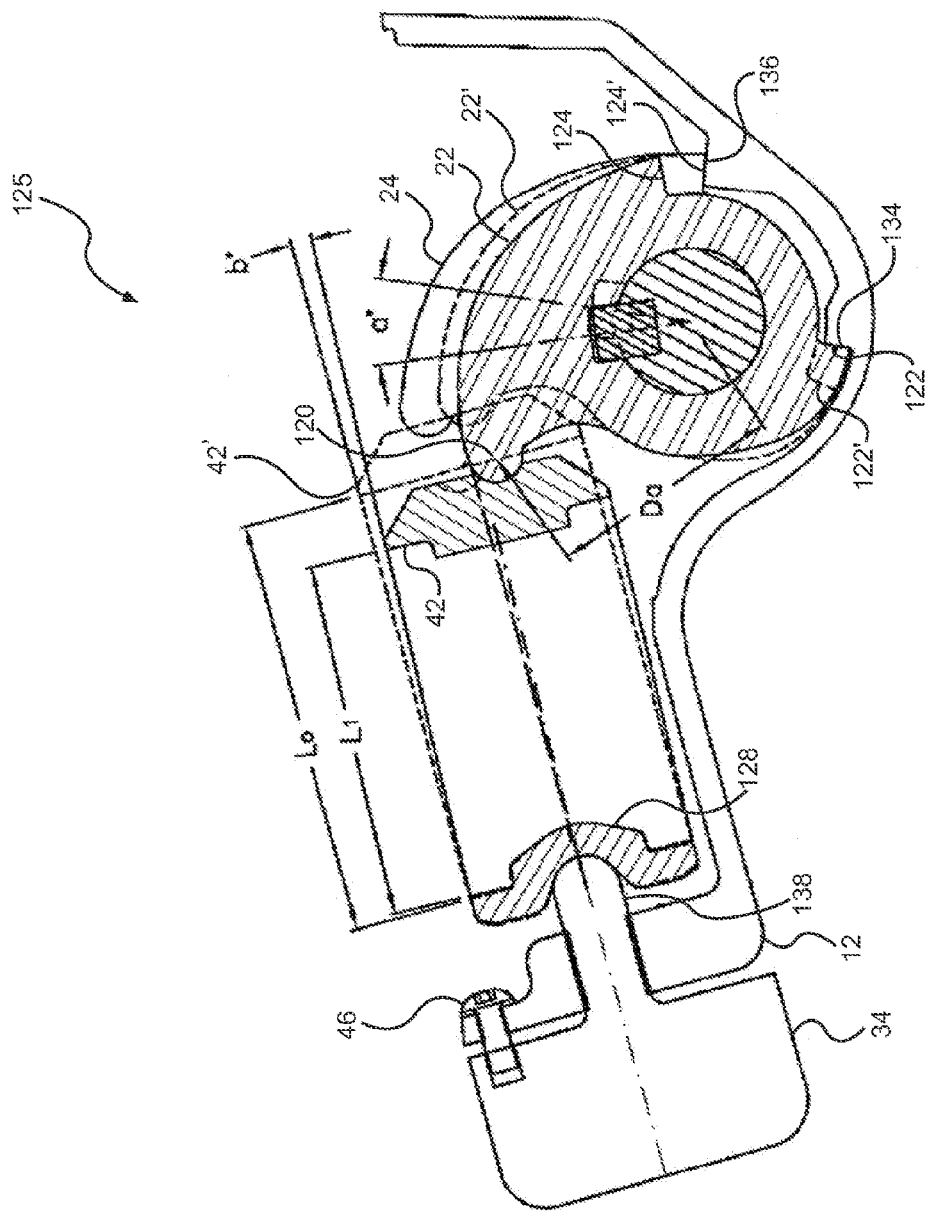
FIG. 8 is a partially sectioned view in side elevation of the pivoting mechanism of FIG. 1 in a second configuration.

With the spring arrangements 125 and 127 assembled as is shown in relation to the first spring arrangement 125 in FIGS. 7 and 8, the springs 30 and 32 and the caps 38, 40, 42, and 44 will be entirely suspended between the tip of the extension and retraction rod 138 and the tips 120 of the respective cam or cams 22, 24, 26, and 28, potentially with no other points of contact. The rounded tips 120 of the cams 22, 24, 26, and 28 engage the correspondingly rounded grooves 130 and 132, and the rounded tip of the rod 138 engage the rounded surface of the protuberance 128. Consequently, there will be minimal friction losses, and substantially all energy instilled into the springs 30 and 32 will be returned to the shaft 14 and, ultimately, to the seat occupant thereby enabling a seat occupant to pivot to a reclined position as desired and to return to an upright position with minimized effort. Substantially the entire force imparted by the cams 22, 24, 26, and 28 is directed along the longitudinal axis of the spring 30.

As shown in FIG. 7, when engaged by the locking slide 20, the first cam 22 will act upon the cap 42 and thus the spring 30 over a moment arm $D_a$ while the second cam 24 will act upon the cap 42 and thus the spring 30 over a moment arm $D_b$ when the second cam 24 is engaged by the locking slide 20. Therefore, with the single spring 30, at least first and second pivoting resistance zones can be established by selectively aligning the body portion 108 of the locking slide 20 to engage one cam 22 or 24 while causing the other cam 24 or 22 to align with the channel 110.

Figure 9:
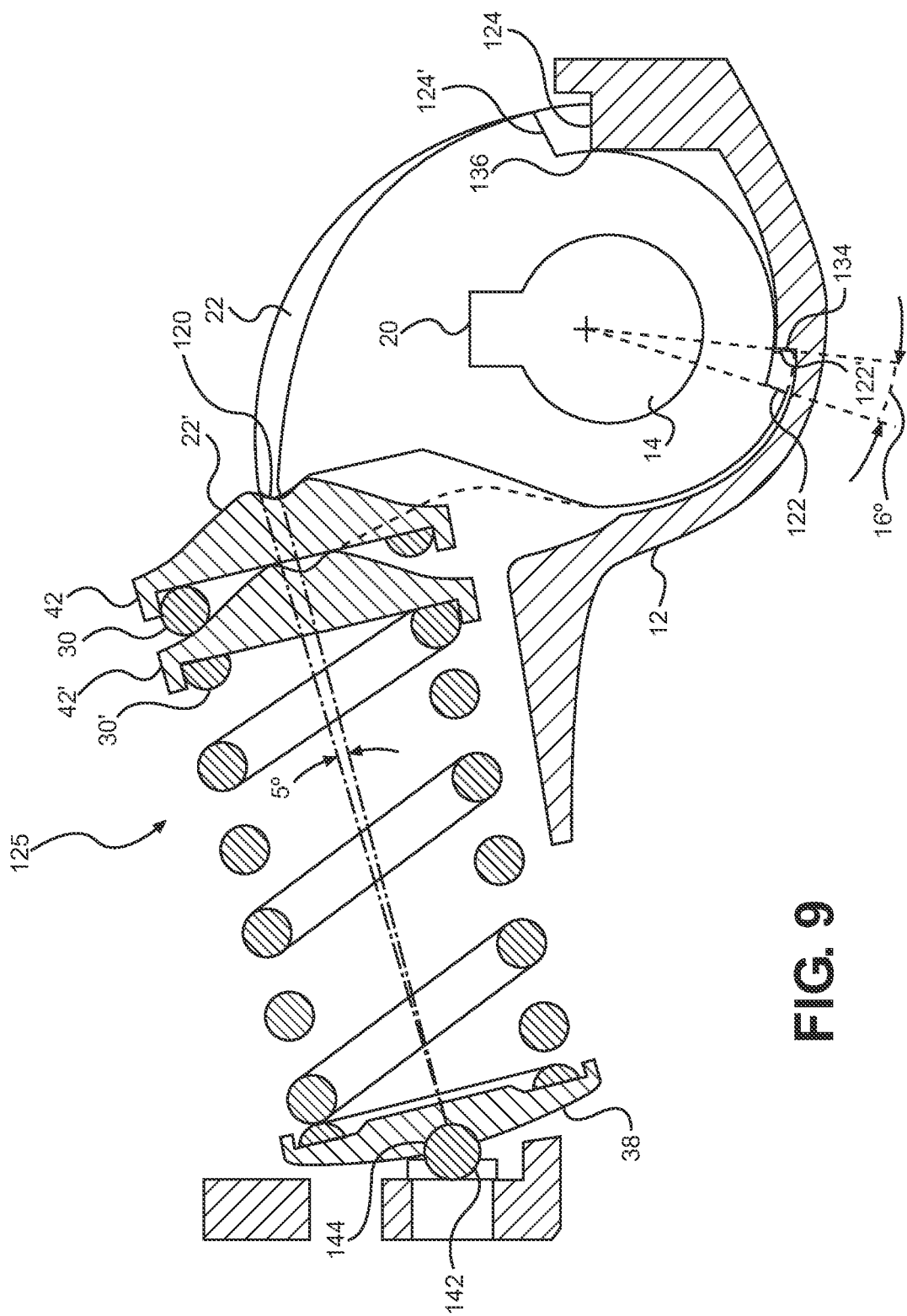
FIG. 9 is a partially-sectioned view in side elevation of an alternative pivoting mechanism as taught herein.

As shown in relation to the embodiment of the spring arrangement 125 of FIG. 9, it is also possible to have a single cam 22 associated with a given spring 30. With multiple such arrangements 125, one could select which and how many arrangements 125 are actuated thereby adjusting between resistance zones provided by one spring 30 as compared to another spring 30 and combinations of springs 30. When engaged, the cam 22 will pivot with the shaft 14 in a counterclockwise direction. Acting over the moment arm from the tip 120 to then pivot axis of the cam 22, the tip 120 will press on the spring cap 42 thereby to compress the spring 30 until the spring and spring cap are positioned as shown at 30' and 42'. The spring cap 38 has a hemispherical indentation 144 on its outer surface, which receives a ball bearing 142.

So configured, the spring 30 will be permitted to pivot about a given angle, which is shown as 5 degrees in the drawing. The cam 22 is adjusted to the position shown at 22' as the stop surfaces 122 and 124 move from the upright position where the upright stop surfaces 124 and 136 engage one another to the positions shown at 122' and 124' where the reclined stop surfaces 122' and 134 make contact. While the degree of pivoting will vary, the depicted embodiment permits a pivoting of the shaft 14 and thus the retained arm and seat back structures 98, 100, and 162 through an angle of 16 degrees.

Within the contemplated scope of the invention, there are numerous possible variations in the number of springs 30 and 32, the performance characteristics of the springs 30 and 32, the number of cams 22, 24, 26, and 28, the number and location of cam channels 110 in the locking slide 20, and other variables that might be employed to enable the provision of multiple resistance zones that can readily be set simply by actuation of the locking slide 20 via the resistance adjustment arm 50. Compression springs are shown at 30 and 32 in the previously referenced drawings. However, it will be appreciated that substantially any type of resiliently compressible member or members, which could be formed from any one of a wide variety of materials or combinations thereof, could potentially be employed as springs, including those indicated at 30 and 32, within the scope of the invention.

Figure 18:
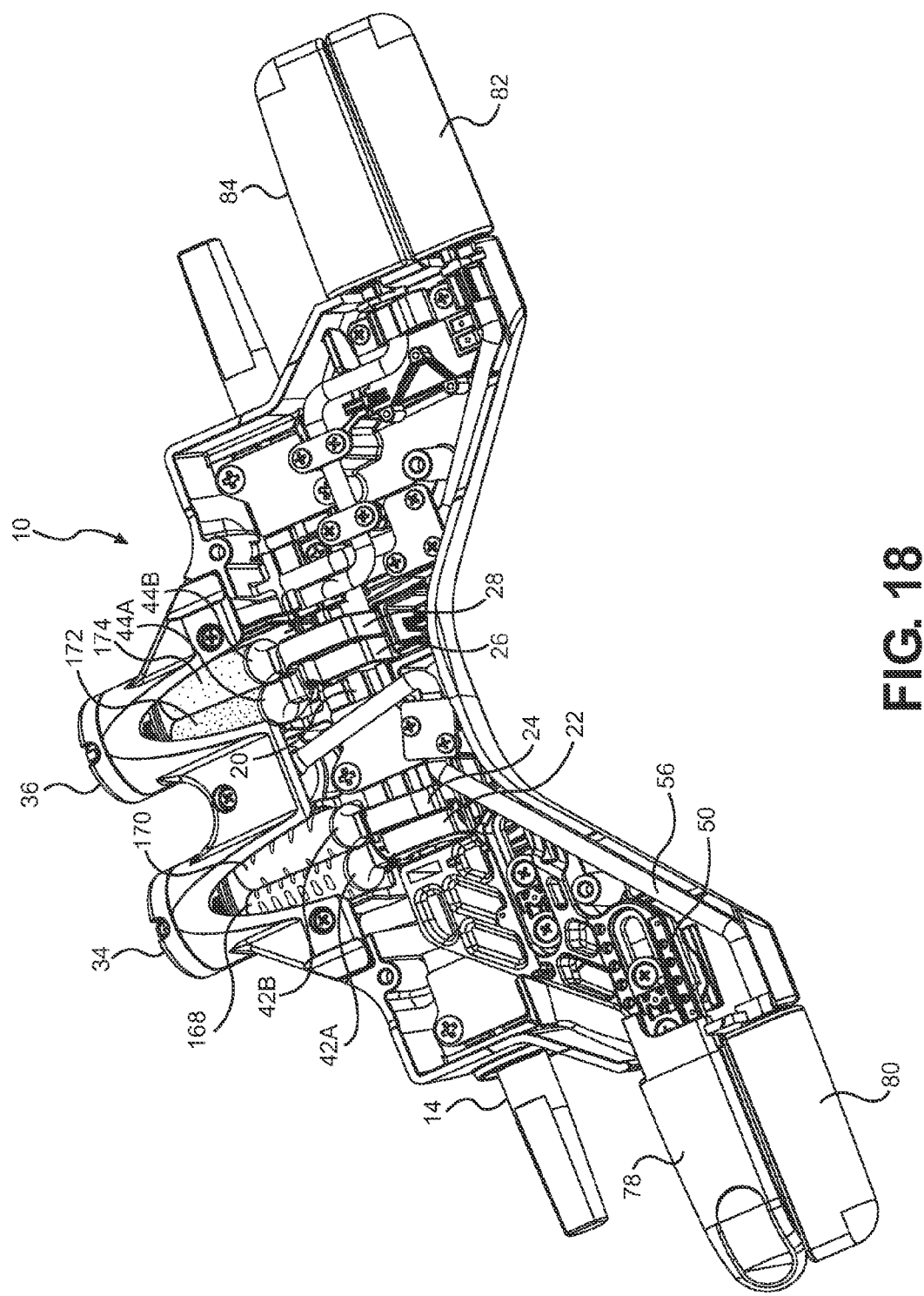
FIG. 18 is a perspective view of an alternative pivoting mechanism with gross and fine resistance adjustment under the present invention.

One alternative example of many alternative resiliently compressible members that could be employed within the scope of the invention is shown in relation to the pivoting mechanism 10 of FIG. 18. There, the first compression spring 30 is replaced by first and second rods 168 and 170 of resiliently compressible foam sponge, and the second compression spring 32 is replaced by third and fourth rods 172 and 174 of resiliently compressible foam sponge. The rods 168 and 170 and the rods 172 and 174 can have different compression properties, which may or may not be characterized by spring constants.

The first rod 168 has a spring cap 42A that engages the tip of the first cam 22 to be selectively compressed thereby, and the second rod 170 has a spring cap 42B that engages the tip of the second cam 24. Likewise, the third cam 26 engages a spring cap 44A at the end of the third rod 172, and the fourth cam 28 engages a spring cap 44B disposed at the end of the fourth rod 174. With this, the locking slide 20 can be adjusted to engage one or more of the cams 22, 24, 26, and 28 thereby to compress and be resisted by one or more of the resiliently compressible rods 168, 170, 172, and 174.

Looking to FIGS. 14 and 15, one can gain a further understanding of the adjustments between resistance zones enabled by the exemplary embodiment of FIG. 1. In FIG. 14, the locking slide 20 is positioned along the channel 96 with its end clear of the third and fourth cams 26 and 28. The third and fourth cams 26 and 28 are thus free from pivoting with the shaft 14 such that the second spring 32 is entirely inactive. The cam channel 110 is aligned with the second cam 24 whereby it too is free from pivoting with the shaft 14. The locking slide 20 is engaged with the first cam 22 such that it is locked to pivot with the shaft 14 and, in doing so, to compress the first spring 30. The force of the first cam 22 will act over its moment arm, which is less than the moment arm that would be produced by the second cam 24, which is greater in height, and will for the same reason produce less compression of the spring 30 per degree of pivoting of the shaft 14. This can be considered the first setting of the pivoting mechanism 10 establishing a first resistance zone.

The pivoting mechanism 10 can be adjusted to a second setting by repositioning the locking slide 20 until the cam channel 110 is beyond the second cam 24 while leaving the end of the locking slide 20 clear of the second and third cams 26 and 28. So positioned, the locking slide 20 will engage the first and second cams 22 and 24 to cause them to pivot with the shaft 14. The third and fourth cams 26 and 28 will remain free from pivoting with the shaft 14 whereby the second spring 32 will remain inactive. As the shaft 14 is pivoted, the second cam 24 will dominate over the first cam 22 based on the greater height of the second cam 24. The reclining torque produced by the second cam 24 will compress the first spring 30 acting over the greater moment arm produced by the greater height of the second cam 24 as compared to the first cam 22 thereby establishing a second resistance zone.

A third resistance zone can be achieved under the third setting of the pivoting mechanism 10 shown in FIG. 15. There, the locking slide 20 is positioned with the cam channel 110 beyond the first and second cams 22 and 24 and with the end of the locking slide 20 received into and engaging the third cam 26 but not the fourth cam 28. With this, the first, second, and third cams 22, 24, and 26 will be active and keyed to pivot with the shaft 14 while the fourth cam 28 will not. The second cam 24 will act over its moment arm in compressing the first spring 30, and the third cam 26 will act over its moment arm in compressing the second spring 32. The forces of the first and second springs 30 and 32 will thus resist the pivoting of the cams 24 and 26, the shaft 14, and consequently the reclining of the arm and back structures 98, 100, and 162.

Repositioning the locking slide 20 to be received into the fourth cam 28 will establish a fourth resistance zone. In the fourth resistance zone, all four cams 22, 24, 26, and 28 will be keyed to pivot with the shaft 14. The first and second springs 30 and 32 will be compressed by the torque imparted by the second and fourth cams 24 and 28 acting over their moment arms, which may be the same or different.

The pivoting mechanism 10 thus permits substantially instant adjustment between multiple resistance zones so that persons of significantly different sizes, weights, and preferences can be immediately accommodated without excessive adjustment requirements. Likewise, a single person can adjust to different resistance zones for differing tasks, such as by adjusting to the fourth resistance zone during a meeting where maximum resistance to pivoting might be desired and by adjusting to the first resistance zone during a phone call where minimal resistance to pivoting might be desired to enable easy reclining. Furthermore, once the gross adjustment to a desired resistance zone is achieved, the pivoting resistance provided the pivoting mechanism 10 can be finely adjusted to the occupant's exact preference by operation of one or both adjustment knobs 34 and 36 to adjust the initial deflection of the spring or springs 30 and 32.

By operation of the resistance adjustment arm 50 to control the positioning of the locking slide 20, the pivoting mechanism 10 permits selective control over the cam or cams 22, 24, 26, and 28 that are engaged to pivot with the shaft 14. In doing so, the pivoting mechanism 10 potentially permits the selection of the number of springs 30 and 32 that are engaged, the spring constant of springs 30 and 32 that are engaged, and the moment arm between the shaft 14 and the spring or springs 30 and 32. Herein, the inventor attempts to expound on the structural and functional advantages of the varied configurations of the pivoting mechanism 10, but it will be understood by one skilled in the art that numerous further advantages and possibilities are inherent in the structural combinations disclosed herein.

Figure 16:
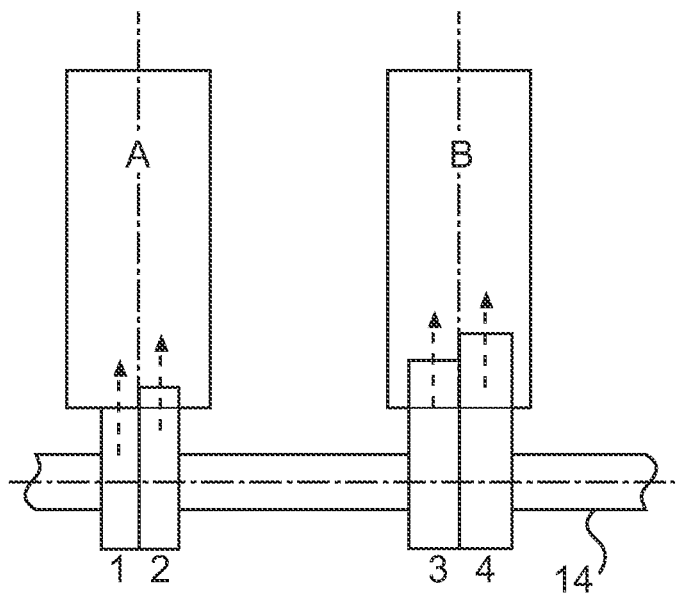
FIG. 16 is a schematic view of a first spring arrangement and various resistance settings therefor.
Figure 17:
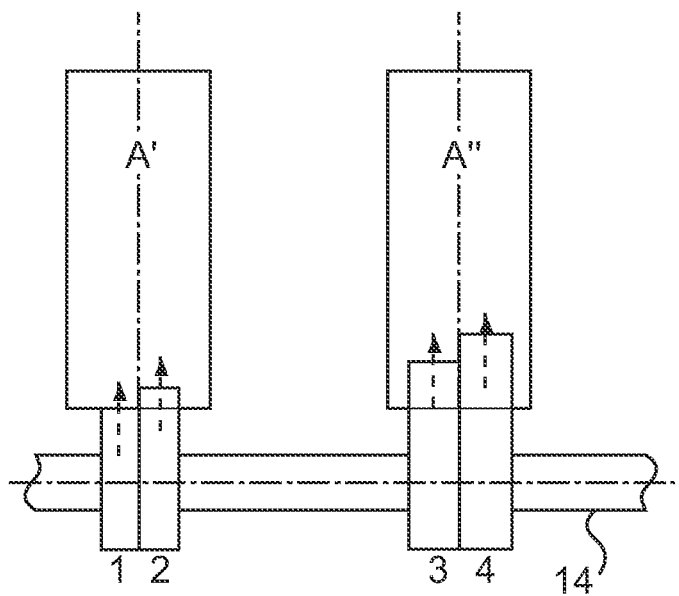
FIG. 17 is a schematic view of a second spring arrangement and various resistance settings therefor.

The schematic depictions of FIGS. 16 and 17 illustrate some possible resistance zones with the pivoting mechanism 10. In FIG. 16, first and second springs A and B have different spring constants, and first, second, third, and fourth cams 1, 2, 3, and 4 can be selectively keyed to pivot to provide resistance to pivoting of the shaft 14. The resistance adjustment arm 50 (not shown in FIGS. 16 and 17) can have setting indications associated therewith indicating a first setting • where the first cam 1 is engaged with the first spring A, a second setting •• where the third cam 3 is engaged with the second spring B, which has a different spring constant than the first spring A, a third setting ••• where the second and third cams 2 and 3 are engaged with the first and second springs A and B respectively, and a fourth setting •••• where the second and fourth cams 2 and 4 are engaged with the first and second springs A and B respectively.

In FIG. 17, the first and second springs A' and A" have the same spring constants. First, second, third, and fourth cams 1, 2, 3, and 4 can again be selectively keyed to pivot to provide resistance to pivoting of the shaft 14. The resistance adjustment arm 50 can have setting indications associated therewith indicating a first setting • where the first cam 1 is engaged with the first spring A', a second setting •• where the third cam 3 is engaged with the second spring A", a third setting ••• where the first and third cams 1 and 3 are engaged with the first and second springs A' and A" respectively, and a fourth setting •••• where the second and fourth cams 2 and 4 are engaged with the first and second springs A and A" respectively.

Figure 26:
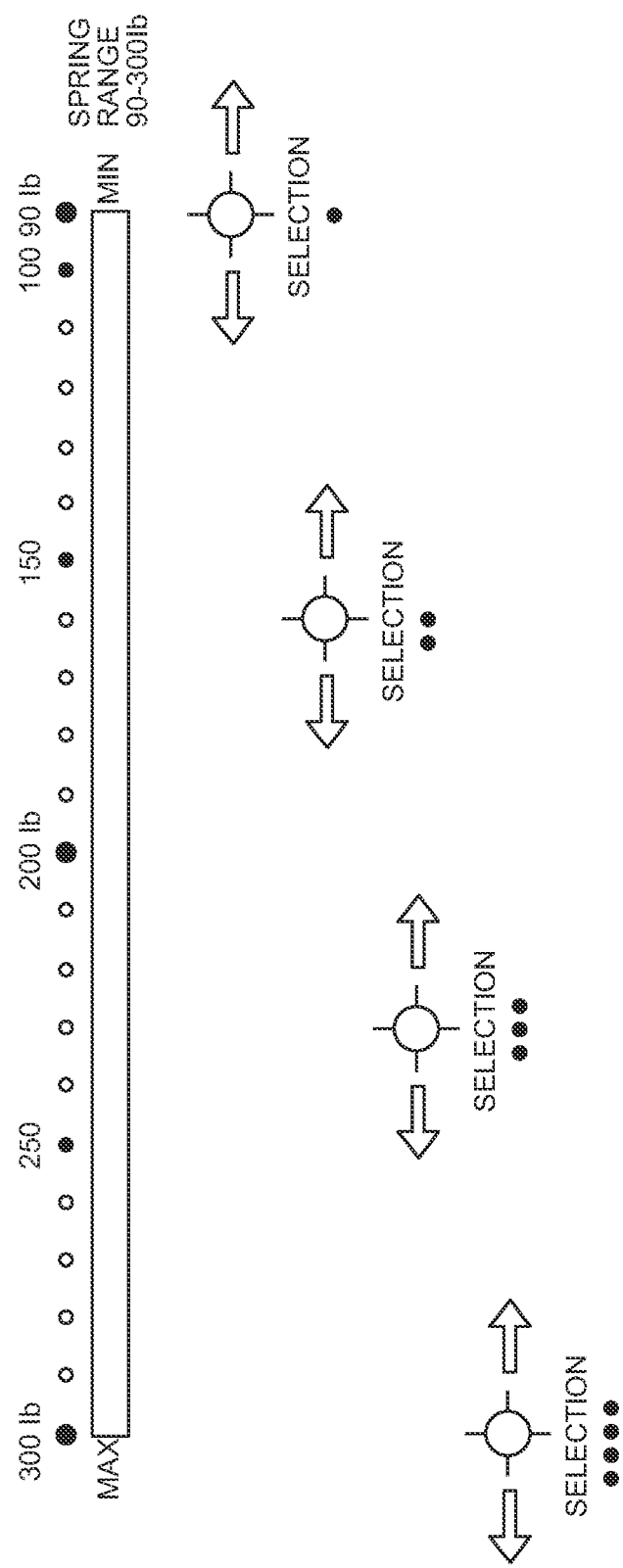
FIG. 26 is a diagram depicting the gross and fine tension adjustment characteristics of a pivoting mechanism according to the invention.

Perhaps an even better understanding of the capabilities of the gross and fine pivoting resistance adjustments permitted under the present invention can be had by reference to the schematic depiction of FIG. 26. There, for one specific exemplary embodiment to which the invention is by no means limited, it can be seen that the pivoting mechanism 10 can provide immediate gross adjustment to suit seat occupants ranging in weight from 90 pounds to 300 pounds by adjustment to pre-established settings having predetermined pivoting resistance. The pivoting mechanism 10 can also provide fine pivoting resistance adjustment within a given range of each pre-established setting, whether only upward, only downward, or both upward and downward as suggested by the directional arrows.

The gross adjustment can be carried out by selectively positioning the locking slide 20 as previously described, and the fine adjustment can be carried out by selectively turning one or both adjustment knobs 34 and 36. A person in the range of 90 pounds can thus immediately and conveniently adjust to the first setting • and then, if desired, finely adjust resistance for personal preference, varied tasks, or some other reason. Similarly, a person weighing in the range of 160 pounds can slide the locking slide 20 to the second setting ••, a person in the range of 230 pounds can select the third setting •••, and a person weighing 300 pounds can select the fourth setting ••••, with each person additionally being able to make fine adjustments if necessary and desired.

While the ability to adjust pivoting resistance as described and illustrated herein is considered highly advantageous, it is appreciated that there will be occasions where absolutely no pivoting of the arm and seat back structures 98, 100, and 162 is desired. To facilitate that, the pivoting mechanism 10 of FIG. 1 includes a means for restricting the shaft 14 against pivoting. More particularly, the pivoting mechanism 10 includes a locking wedge 25 fixed to a first end of a pivotable recline lock lever 62 and can be actuated into and out of engagement with the channel 96 in the shaft 14 by operation of the lock lever 62. The lock lever 62 projects outboard of the left side of the housing 12 and can be controlled by a handle 82 that is fixed thereto. So arranged, the handle 82 can be adjusted to a first position where the locking wedge 25 is inserted into the channel 96 to prevent pivoting of the shaft 14 and to a second position where the locking wedge 25 is clear of the channel 96 to permit pivoting of the shaft 14.

A spring clip 62, which could be formed from spring steel, resilient plastic, or any other material or combination thereof, is secured relative to the housing 12 and receives the lock lever 62. The spring clip 62 has first and second resiliently engaged sides with first and second broadened portions therebetween. With this, the lock lever 62 can be positioned and retained by the clip 62 in the first position locking the arm and back structures 98, 100, and 162 against reclining and repositioned and retained by the clip 62 in the second position permitting reclining.

As depicted in relation to the chair 200 of FIG. 19, chairs 200 exploiting the present invention are contemplated where the back structure 162 is pivotally retained by the pivoting mechanism 10 by the outboard ends of the shaft 14 so that the seat back structure 162 can pivot rearwardly while the seat structure 156 remains stationary. However, as shown for example in FIGS. 20 and 21, embodiments of pivoting mechanisms 10 and resulting chairs 200 according to the invention are contemplated where both the seat back structure 162 and the seat bottom structure 156 are retained to pivot together by the pivoting mechanism 10.

The pivoting mechanism 10 in FIGS. 20 through 23 again has a shaft 14 with distal ends projecting outboard of a housing 12. The pivoting inner workings of the pivoting mechanism 10 can be as described previously or hereinbelow or in any other construction that exploits the invention disclosed herein. Left and right pivot arms 180 have proximal ends fixed to pivot with the outboard ends of the shaft 14 by a chamfering of the shaft 14 in combination with bolts 186 that pass through apertures at the proximal end of the pivot arms 180 and into the ends of the shaft 14. The distal ends of the pivot arms 180 have support brackets 182 fixed thereto whether by integral formation or some other method. The seat structure 156 is fixed to the support brackets 182 of the support arms 180, and the back structure 162 is retained by being fastened to the seat structure 156 and, additionally or alternatively, the support brackets 182 of the support arms 180. The arm structures 98, which are extendable and retractable, are also fastened to the seat structure 156 and, additionally or alternatively, the support brackets 182 of the support arms 180.

Figure 22:
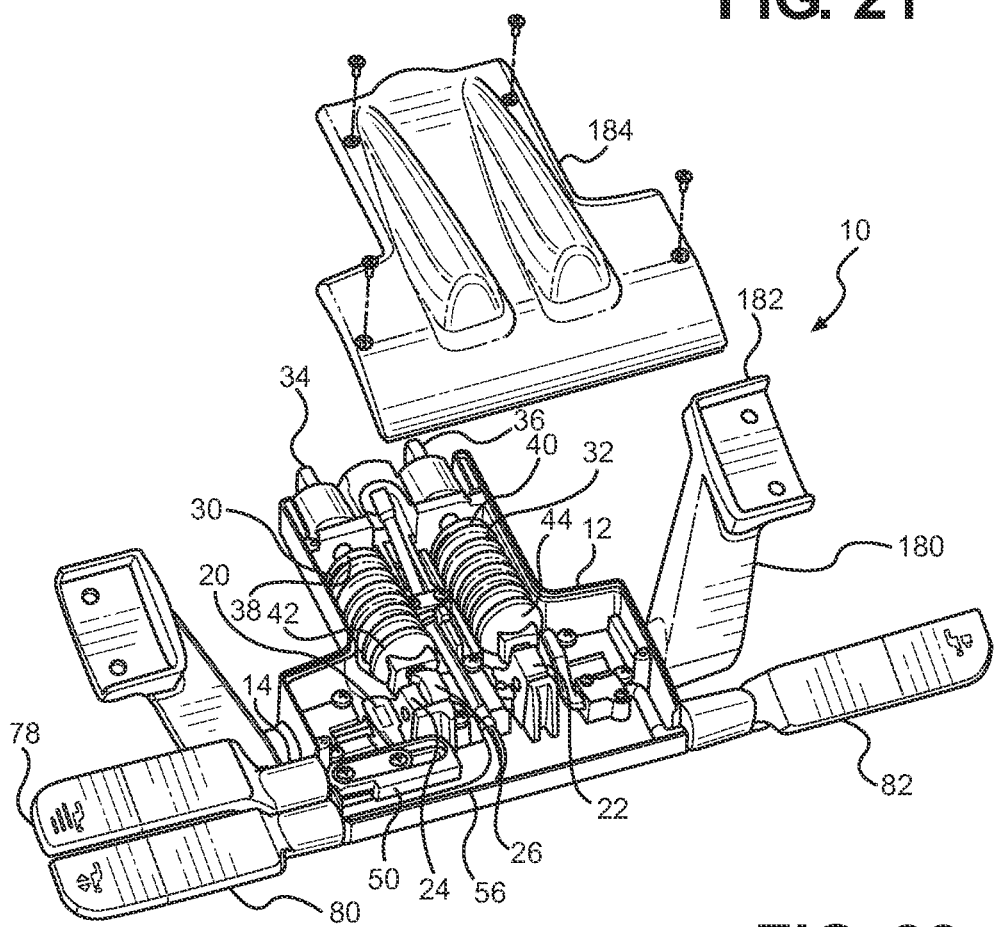
FIG. 22 is a partially exploded perspective view of the pivoting mechanism of FIG. 21.

Under this configuration of the chair 200, the seat and back structures 156 and 162 will pivot together relative to the pivoting mechanism 10 as the support arms 180 impart torque on the shaft 14. The arm structures 98 can be raised and lowered as desired. The pivoting resistance exhibited by the pivoting mechanism 10 can undergo a gross adjustment by operation of the handle 78 to slide the resistance adjustment arm 50 thereby moving the locking slide 20 within the channel 96, and the pivoting resistance exhibited by the pivoting mechanism 10 can undergo a fine adjustment by a selective rotation of the handles 34 and 36 to adjust the initial compression of the springs 30 and 32 as shown in FIG. 22, for example. Moreover, the overall height of the arm, seat, and back structures 98, 156, and 162 can be adjusted by operation of the piston 88 through the handle 80.

Figure 20:
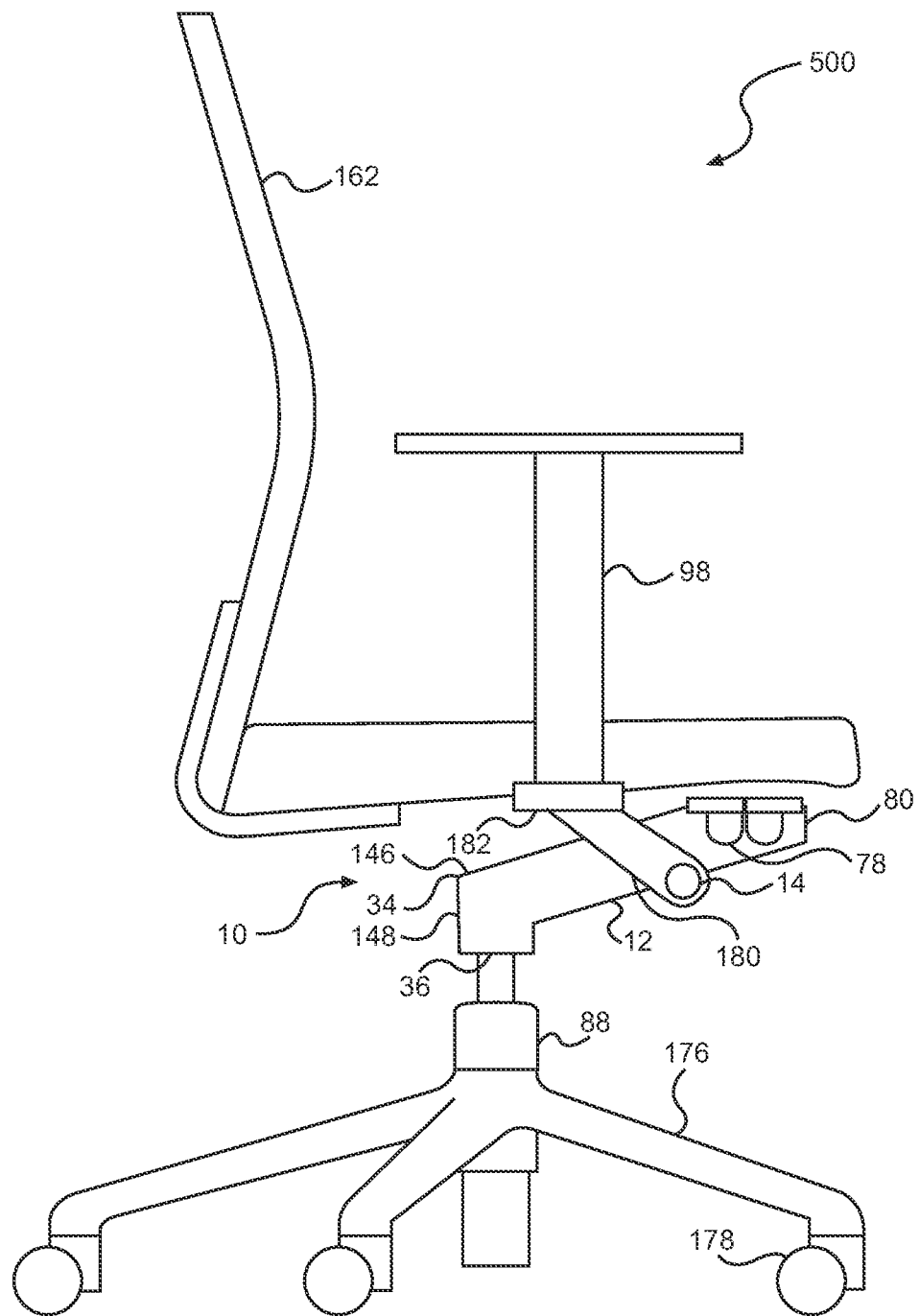
FIG. 20 is a view in side elevation of an alternative chair incorporating the pivoting mechanism of the invention.
Figure 21:
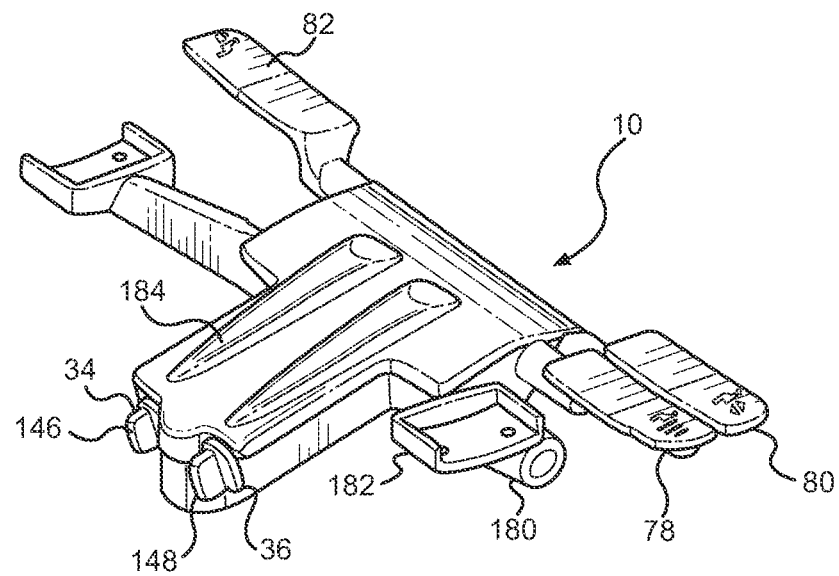
FIG. 21 is a perspective view of a pivoting mechanism as disclosed herein.
Figure 23:
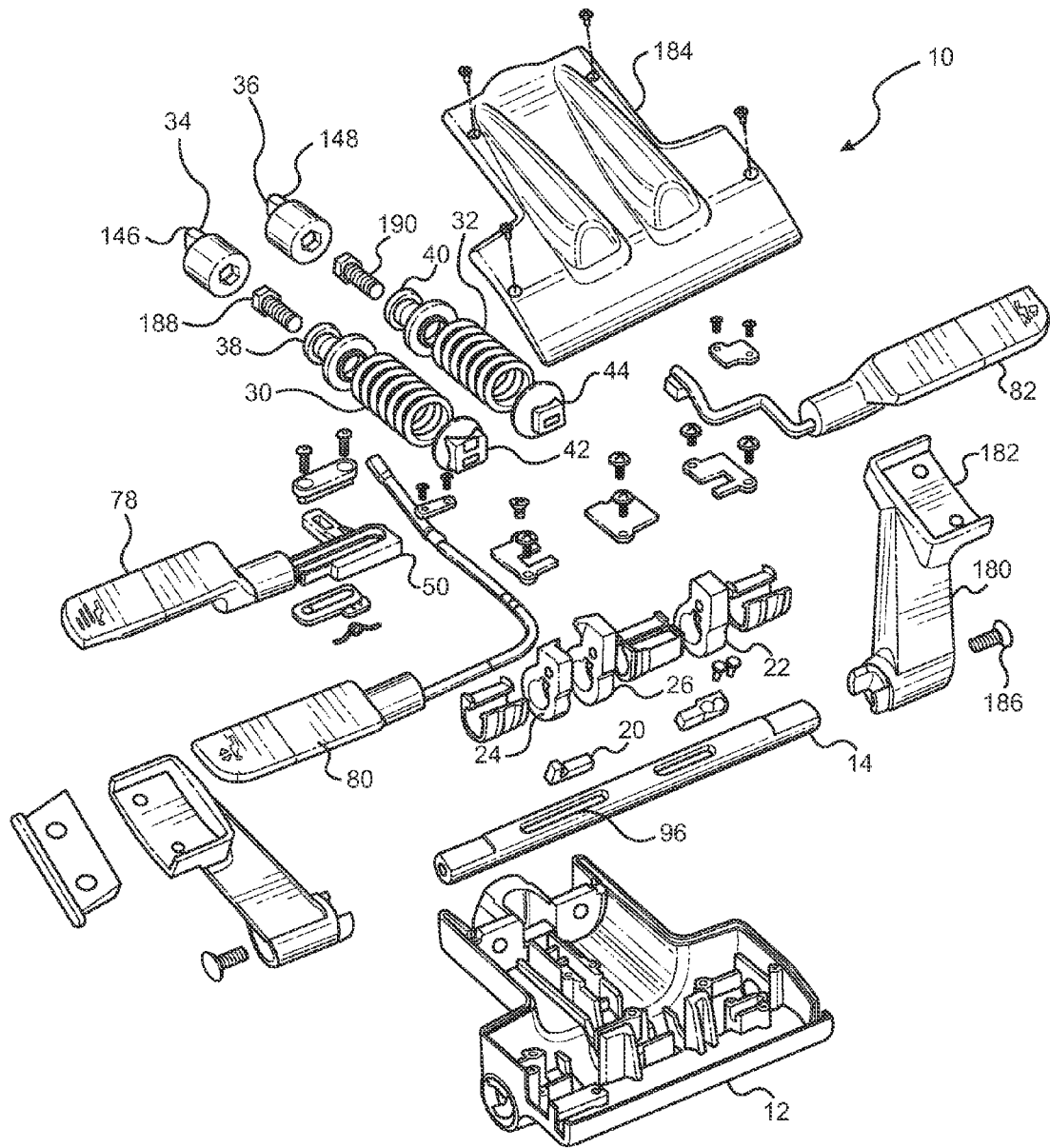
FIG. 23 is an exploded perspective view of the pivoting mechanism of FIG. 21.

Looking further to FIGS. 22 and 23, the alternative pivoting mechanism 10 according to the invention exploited in FIG. 20 and depicted in FIG. 21 is shown with the protective cover 184 thereof removed. With that, one can see that first and second springs 30 and 32 are again disposed to be compressed by one or more cams 22, 24, and 26 that are turned when keyed to the shaft 14 by the locking slide 20 by a pivoting of the shaft 14 thereby to provide pivoting resistance to the pivoting of the seat bottom and back structures 156 and 162 through the support arms 180. Resistance adjustment can be finely adjusted by use of the handles 34 and 36 to rotate bolts 190 and 192 thereby to adjust the initial compression of the springs 30 and 32.

This alternative pivoting mechanism 10 exploits three cams 22, 24, and 26 to provide a gross adjustment of the pivoting resistance. Just the first cam 22 is retained to pivot selectively with the shaft 14 to compress the second spring 32 while second and third cams 24 and 26 are retained to pivot selectively with the shaft 14 to compress the first spring 30, all under the control of the locking slide 20 as manipulated by the handle 78. The second and third cams 24 and 26 have different effective radii of contact with the spring cap 42 with the third cam 26 having a greater radius of contact with the spring cap 42 than the second cam 24 thereby producing a different pivoting resistance. By adjusting the longitudinal location of the locking slide 20, three predetermined pivoting resistances can be reached immediately to accommodate distinctly different persons and preferences. For example, the first cam 22 can be constantly engaged, and the second and third cams 24 and 26 can be selectively engaged so that only the first cam 22 can provide a first pivoting resistance, the first and second cams 22 and 24 can provide a second pivoting resistance, or the first and third cams 22 and 26 can provide a third pivoting resistance.

Figure 24:
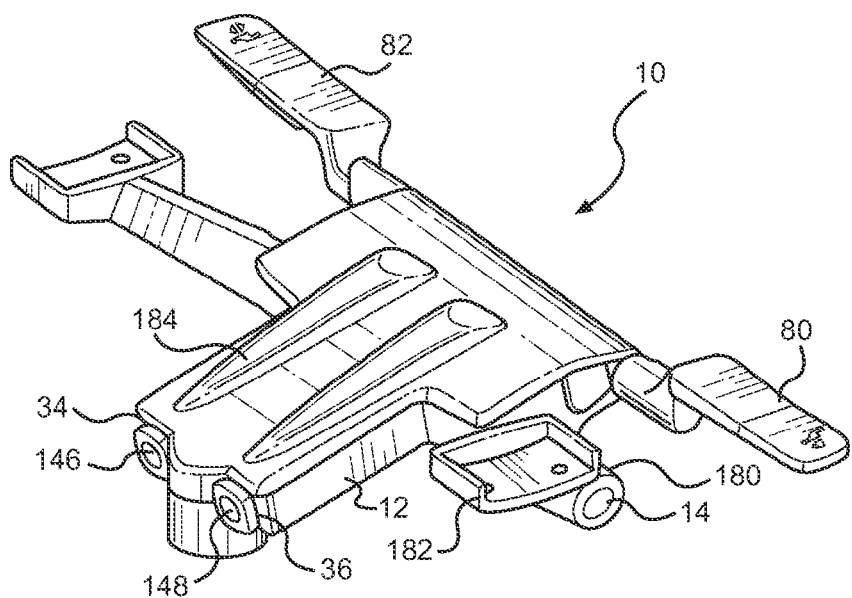
FIG. 24 is a perspective view of an alternative pivoting mechanism pursuant to the present invention.
Figure 25:
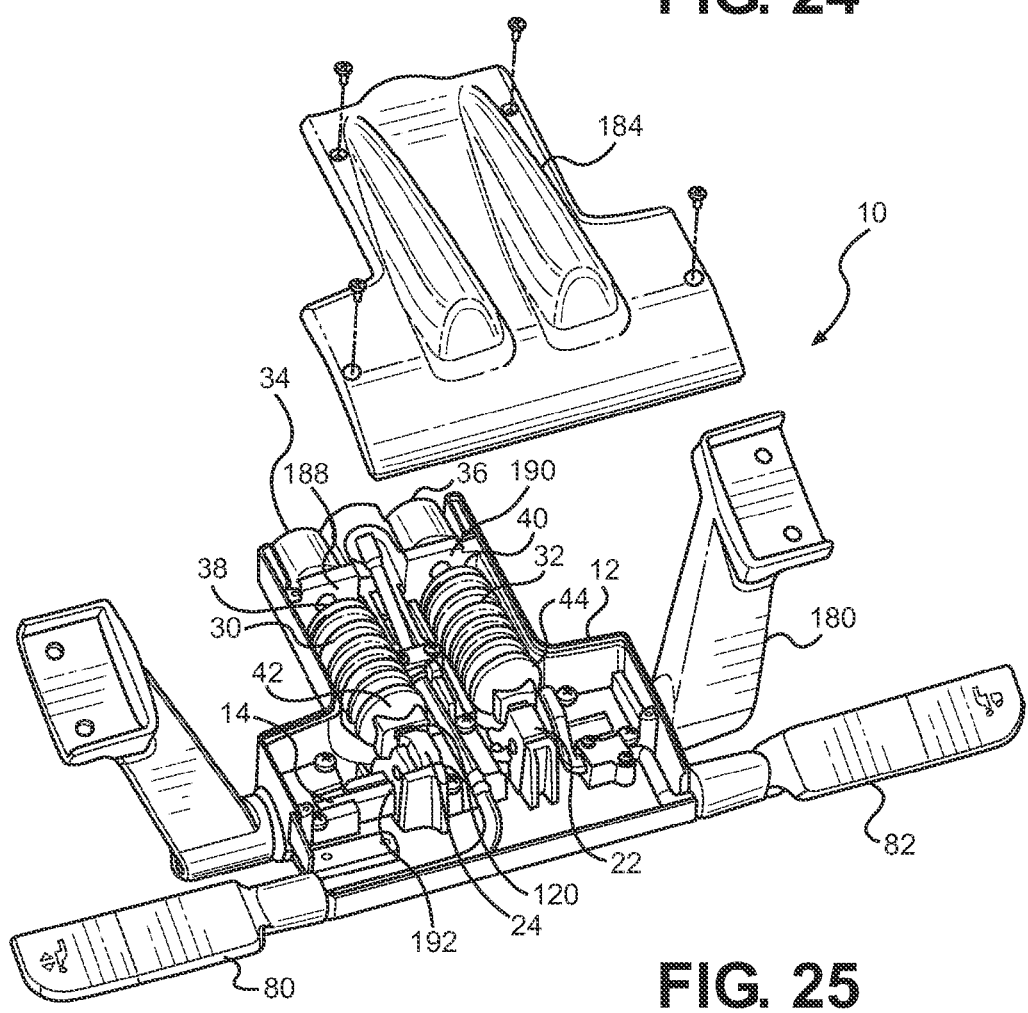
FIG. 25 is a partially exploded perspective view of the pivoting mechanism of FIG. 24.

Turning finally to FIGS. 24 and 25, an embodiment of the pivoting mechanism 10 is shown where seat bottom and back structures (not shown) would again be retained to pivot together by support arms 180. The support arms 180 again have proximal ends fixed to pivot with the shaft 14 against pivoting resistance provided by the first and second springs 30 and 32. Here, however, the locking slide 20 is eliminated, and the cams 22 and 24 are constantly keyed to pivot with the shaft 14, such as by a key 192. Fine resistance adjustment can be accomplished by rotation of one or both handles 34 and 36. The springs 30 and 32 are suspended with only a single contact point at a first end thereof with the tips of the bolts 188 and 190 and the caps 40 and 42 and a single contact point at a second end thereof with the tips 120 of the respective cams 22 and 24 with the caps 42 and 44.

With certain details and embodiments of the pivoting mechanisms 10 and resulting chairs 200 of the present invention disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

The invention claimed is:

1. A pivoting mechanism with gross and fine adjustment mechanisms comprising:
   a housing with first and second sides;
   an elongate shaft pivotally retained by the housing wherein the shaft has first and second ends;
   a first resiliently deformable member retained by the housing wherein the first resiliently deformable member has a first end and a second end;
   a first cam member coupled to the shaft wherein the first cam member is disposed to deform the first resiliently deformable member when the first cam member is pivoted;
   means for selectively causing the first cam member to pivot with the shaft whereby the shaft exhibits pivoting resistance when the first cam member is caused to pivot with the shaft.

2. The pivoting mechanism of claim 1 further comprising an output interface for outputting the pivoting resistance exhibited by the shaft.

3. The pivoting mechanism of claim 2 wherein the output interface comprises an end of the shaft.

4. The pivoting mechanism of claim 3 wherein the output interface comprises the first and second ends of the shaft.

5. The pivoting mechanism of claim 3 further comprising a seat back structure and a seat bottom structure coupled to the pivoting mechanism wherein the end of the shaft is fixed to pivot with the seat back structure of the chair.

6. The pivoting mechanism of claim 5 wherein the end of the shaft is fixed to pivot with the seat back structure and the seat bottom structure of the chair.

7. The pivoting mechanism of claim 5 wherein the first and second ends of the shaft are fixed to pivot with the seat back of the chair.

8. The pivoting mechanism of claim 1 wherein the means for selectively causing the first cam member to pivot with the shaft comprises a locking slide bar that is longitudinally slidable relative to the shaft wherein the locking slide bar has a first position wherein the first cam member is locked to pivot with the shaft and a second position wherein the first cam member is not locked to pivot with the shaft.

9. The pivoting mechanism of claim 8 wherein the locking slide bar is slidably received into a longitudinal channel in the shaft.

10. The pivoting mechanism of claim 9 wherein the first cam member has a central aperture that receives the shaft therethrough and a lateral key channel that receives the locking slide bar when the locking slide bar is in the first position.

11. The pivoting mechanism of claim 1 further comprising a second cam member coupled to the shaft wherein the second cam member is disposed to deform the resiliently compressible member when the second cam member is pivoted and means for selectively causing the second cam member to pivot with the shaft whereby the shaft exhibits pivoting resistance when the second cam member is caused to pivot with the shaft.

12. The pivoting mechanism of claim 11 wherein the first cam member is disposed to deform the resiliently compressible member over a first moment arm and wherein the second cam member is disposed to deform the resiliently compressible member over a second moment arm different than the first moment arm whereby first and second pivoting resistance zones can be established.

13. The pivoting mechanism of claim 11 wherein the means for selectively causing the first cam member to pivot with the shaft and the means for selectively causing the second cam member to pivot with the shaft has a first position wherein the first cam member is locked to pivot with the shaft and a second position wherein the second cam member is locked to pivot with the shaft.

14. The pivoting mechanism of claim 11 wherein the means for selectively causing the first cam member to pivot with the shaft and the means for selectively causing the second cam member to pivot with the shaft comprises a locking slide bar that is longitudinally slidable relative to the shaft wherein the locking slide bar has a first position wherein the first cam member is locked to pivot with the shaft and a second position wherein the second cam member is locked to pivot with the shaft.

15. The pivoting mechanism of claim 14 wherein the locking slide bar is slidably received into a longitudinal channel in the shaft, wherein the first cam member has a central aperture that receives the shaft therethrough and a lateral key channel that receives the locking slide bar when the locking slide bar is in the first position, wherein the second cam member has a central aperture that receives the shaft therethrough and a lateral key channel that receives the locking slide bar when the locking slide bar is in the second position.

16. The pivoting mechanism of claim 15 wherein the locking slide bar has a laterally disposed cam channel in a midportion of the locking slide bar wherein the cam channel is wider than at least the first cam so that the first cam will not be keyed to pivot with the shaft when the cam channel is aligned with the first cam.

17. The pivoting mechanism of claim 1 wherein the first resiliently deformable member comprises a spring.

18. The pivoting mechanism of claim 1 further comprising a second resiliently deformable member with a first end and a second end, a second cam member coupled to the shaft wherein the second cam member is disposed to deform the second resiliently deformable member when the second cam member is pivoted, and means for selectively causing the second cam member to pivot with the shaft whereby the shaft exhibits pivoting resistance when the second cam member is caused to pivot with the shaft.

19. The pivoting mechanism of claim 18 wherein the first cam member is disposed to deform the resiliently compressible member over a first moment arm and wherein the second cam member is disposed to deform the resiliently compressible member over a second moment arm different than the first moment arm whereby first and second pivoting resistance zones can be established.

20. The pivoting mechanism of claim 18 wherein the means for selectively causing the first cam member to pivot with the shaft and the means for selectively causing the second cam member to pivot with the shaft has a first position wherein the first cam member is locked to pivot with the shaft and a second position wherein the second cam member is locked to pivot with the shaft.

21. The pivoting mechanism of claim 20 wherein the means for selectively causing the first cam member to pivot with the shaft and the means for selectively causing the second cam member to pivot with the shaft has a third position wherein the first and second cam members are locked to pivot with the shaft.

22. The pivoting mechanism of claim 1 further comprising means for selectively adjusting an initial deformation of the first resiliently deformable member.

23. The pivoting mechanism of claim 22 wherein the means for selectively adjusting the initial deformation of the first resiliently deformable member comprises a means for selectively compressing or decompressing the first resiliently deformable member.

24. The pivoting mechanism of claim 23 wherein the first cam member has an eccentric portion disposed to engage the first end of the first resiliently compressible member and wherein the means for selectively compressing or decompressing the first resiliently deformable member comprises an extendable and retractable member disposed to engage the second end of the first resiliently compressible member.

25. The pivoting mechanism of claim 24 wherein the extendable and retractable member comprises a threaded rod and a means for rotating the threaded rod.

26. The pivoting mechanism of claim 25 wherein the threaded rod has a tip that engages the second end of the first resiliently compressible member and wherein the first cam member has a tip that engages the first end of the first resiliently compressible member whereby the first resiliently compressible member can be supported by the tips of the threaded rod and the first cam member.

27. A pivoting mechanism with gross and fine adjustment mechanisms comprising:
a housing with first and second sides;
an elongate shaft pivotally retained by the housing wherein the shaft has first and second ends;
a first resiliently deformable member retained by the housing wherein the first resiliently deformable member has a first end and a second end;
a first cam member coupled to the shaft wherein the first cam member is disposed to deform the first resiliently deformable member when the first cam member is pivoted;
means for selectively causing the first cam member to pivot with the shaft whereby the shaft exhibits pivoting resistance when the first cam member is caused to pivot with the shaft;
a second cam member coupled to the shaft wherein the second cam member is disposed to deform the first resiliently compressible member when the second cam member is pivoted;
means for selectively causing the second cam member to pivot with the shaft whereby the shaft exhibits pivoting resistance when the second cam member is caused to pivot with the shaft;
means for selectively adjusting an initial deformation of the first resiliently deformable member; and
an output interface for outputting the pivoting resistance exhibited by the shaft.

28. The pivoting mechanism of claim 27 wherein the first cam member is disposed to deform the resiliently compressible member over a first moment arm and wherein the second cam member is disposed to deform the resiliently compressible member over a second moment arm different than the first moment arm whereby first and second pivoting resistance zones can be established.

29. The pivoting mechanism of claim 27 wherein the means for selectively causing the first cam member to pivot with the shaft and the means for selectively causing the second cam member to pivot with the shaft has a first position wherein the first cam member is locked to pivot with the shaft and a second position wherein the second cam member is locked to pivot with the shaft.

30. The pivoting mechanism of claim 27 further comprising a second resiliently deformable member with a first end and a second end, a third cam member coupled to the shaft wherein the third cam member is disposed to deform the second resiliently deformable member when the third cam member is pivoted, and means for selectively causing the third cam member to pivot with the shaft whereby the shaft exhibits pivoting resistance when the third cam member is caused to pivot with the shaft.

31. The pivoting mechanism of claim 27 wherein the means for selectively causing the first cam member to pivot with the shaft and the means for selectively causing the second cam member to pivot with the shaft has a first position wherein the first cam member is locked to pivot with the shaft and a second position wherein the second cam member is locked to pivot with the shaft.

32. The pivoting mechanism of claim 31 wherein the means for selectively causing the first cam member to pivot with the shaft and the means for selectively causing the second cam member to pivot with the shaft has a third position wherein the first and second cam members are locked to pivot with the shaft.

33. The pivoting mechanism of claim 27 further comprising a seat back structure and a seat bottom structure coupled to the pivoting mechanism wherein the end of the shaft is fixed to pivot with the seat back structure of the chair.

34. The pivoting mechanism of claim 33 wherein the end of the shaft is fixed to pivot with the seat back structure and the seat bottom structure of the chair.

35. The pivoting mechanism of claim 33 wherein the first and second ends of the shaft are fixed to pivot with the seat back of the chair.

* * * * *